United States Patent [19]

Schickedanz

[11] 4,218,119
[45] Aug. 19, 1980

[54] SYSTEM FOR CONTROLLING THE EXPOSURE IN A CAMERA

[75] Inventor: Willi Schickedanz, Offenbach am Main, Fed. Rep. of Germany

[73] Assignee: Canon, Inc., Tokyo, Japan

[21] Appl. No.: 937,738

[22] Filed: Aug. 29, 1978

[30] Foreign Application Priority Data

Aug. 29, 1977 [DE] Fed. Rep. of Germany ....... 2738804

[51] Int. Cl.² .................. G03B 7/08; G03B 13/20; G03B 19/12; G01P 3/36
[52] U.S. Cl. .................. 354/23 D; 354/25; 354/38; 354/50; 354/152; 356/28; 250/201; 250/224; 324/175
[58] Field of Search ............... 354/25, 31, 23 D, 38, 354/43, 44, 50, 51, 152, 66, 23 R; 356/28; 250/224, 221, 201; 324/175, 178

[56] References Cited

U.S. PATENT DOCUMENTS

| | | | |
|---|---|---|---|
| 3,399,307 | 8/1968 | Levin | 250/224 |
| 3,690,234 | 9/1972 | Costianes | 354/23 R |
| 3,997,795 | 12/1976 | Pohl et al. | 354/66 |
| 4,047,187 | 9/1977 | Mashimo et al. | 354/31 X |

FOREIGN PATENT DOCUMENTS 2636769  11/1977  Fed. Rep. of Germany ............. 356/28

Primary Examiner—John Gonzales
Assistant Examiner—William B. Perkey
Attorney, Agent, or Firm—Karl H. Gross

[57] ABSTRACT

A pick-up system includes means for recognizing the displacement of objects to be photographed relative to the optical reproduction plane. The shutter of the pick-up system is actuated according to the relative motion of said objects. In a pick-up system comprising a variable diaphragm and a replaceable film of a special sensitivity, e.g. in an automatic camera, the shutter speed, being a function of the relative motion of the objects, determines the aperture of the diaphragm with respect to the sensitivity of the film.

24 Claims, 21 Drawing Figures

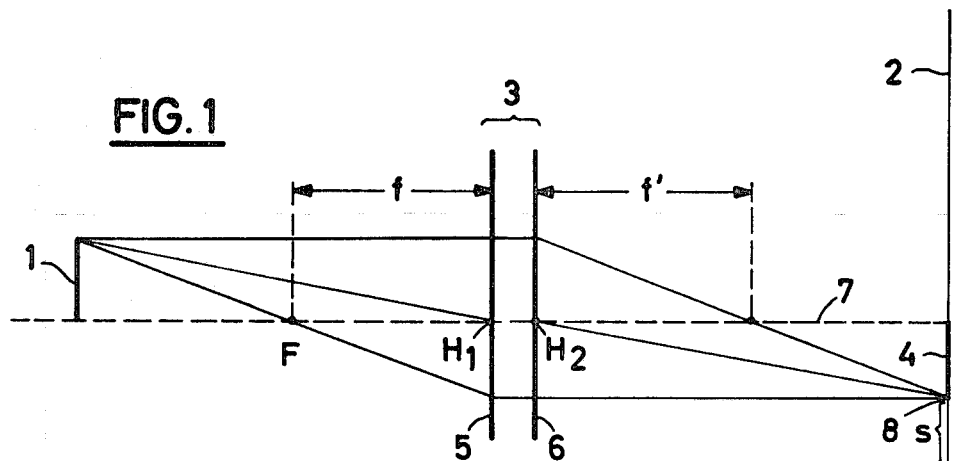
FIG. 1
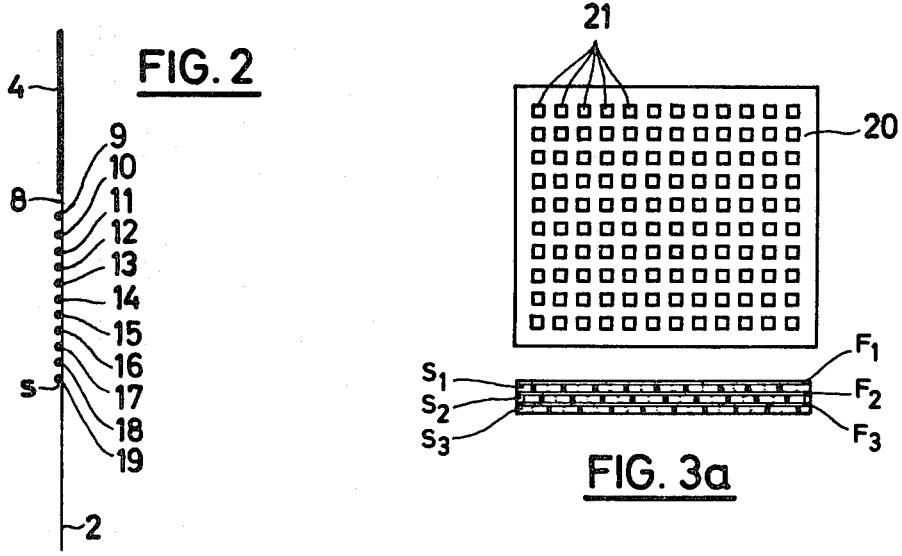
FIG. 2
FIG. 3a
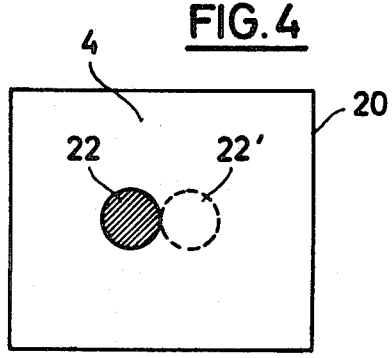
FIG. 4
FIG. 3b

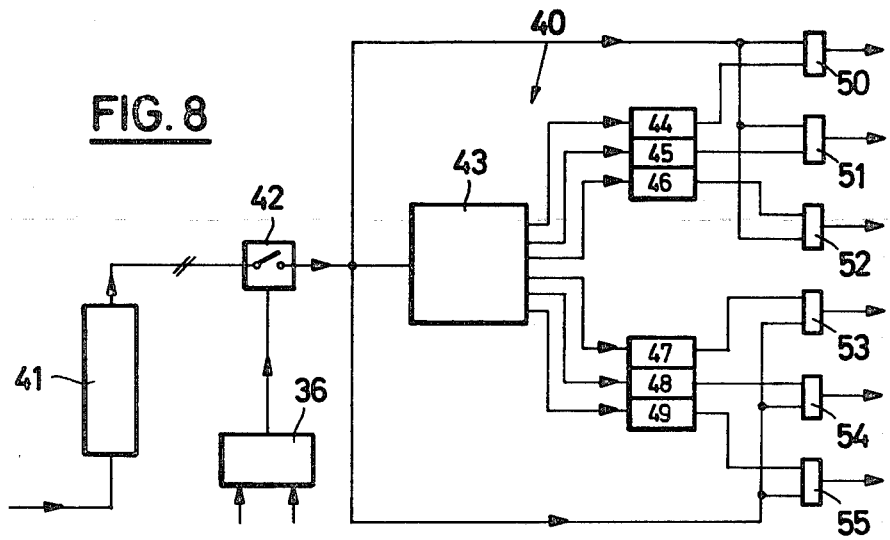
FIG. 8
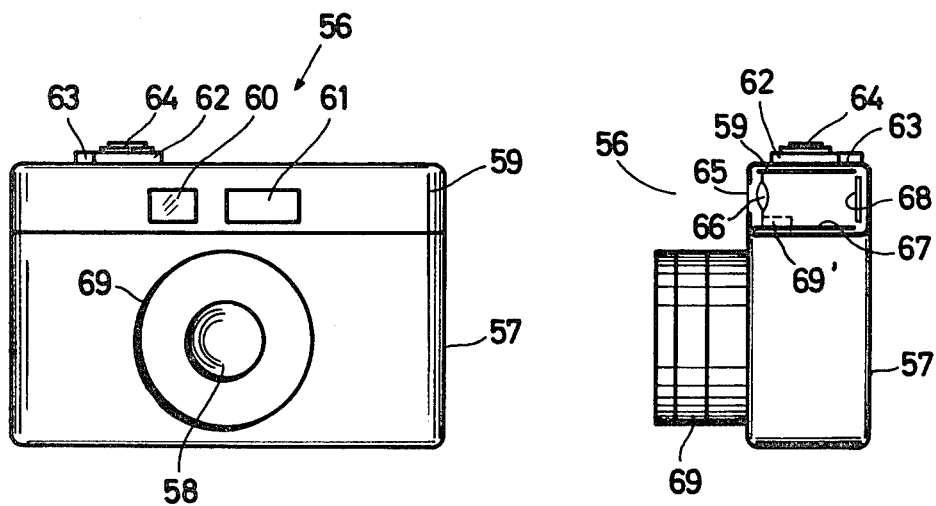
FIG. 9a
FIG. 9b
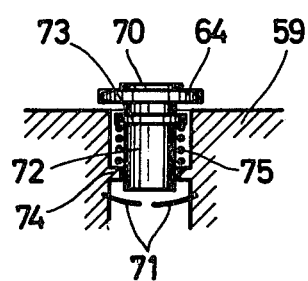
FIG. 10

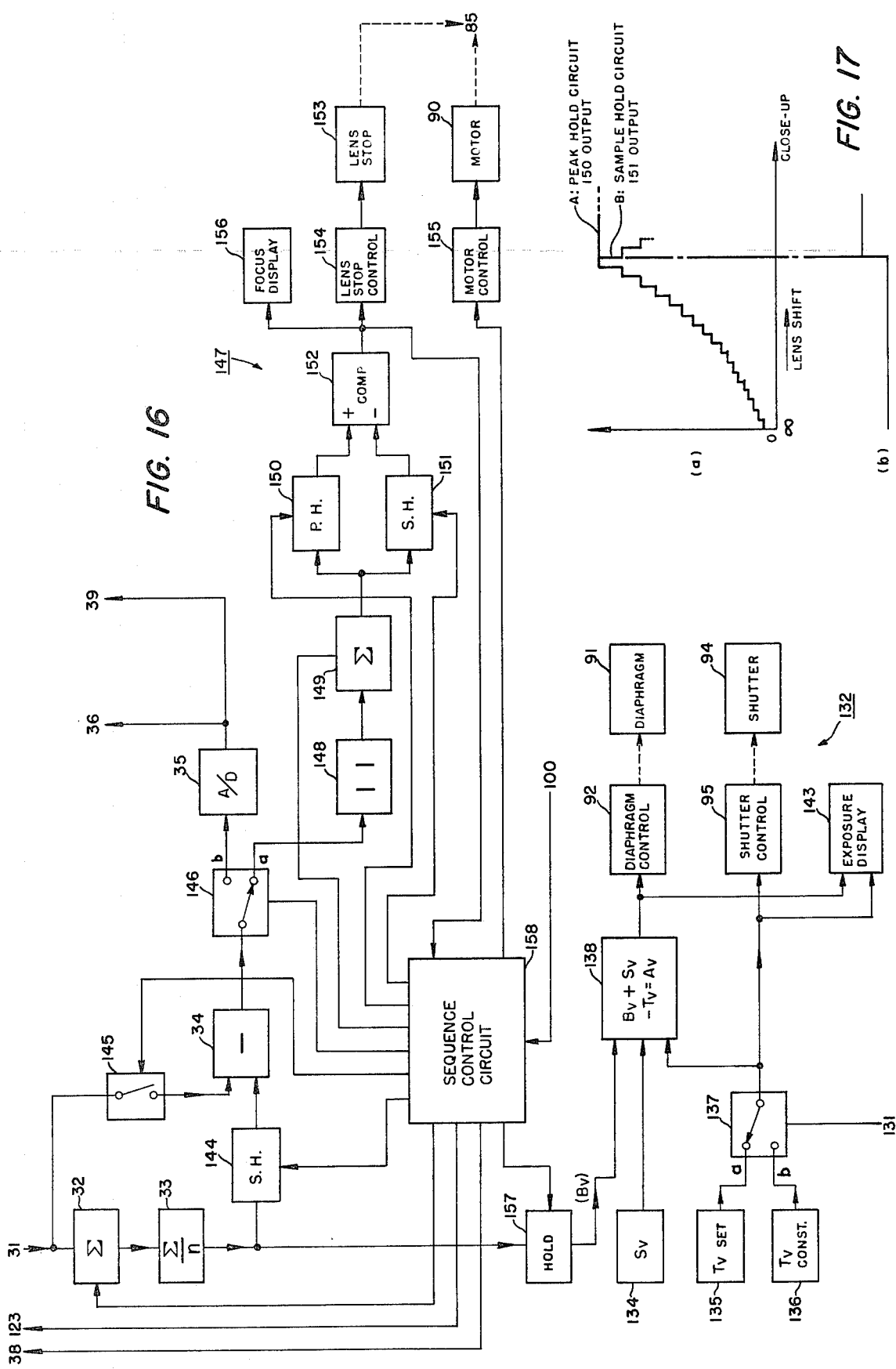

SYSTEM FOR CONTROLLING THE EXPOSURE IN A CAMERA

BACKGROUND OF THE INVENTION

1. Field of the Invention

The present invention relates to an optical pick-up system, and more particularly to an automatic camera. Still more specifically, the invention relates to means for detecting the relative motion of objects in an area to be photographed and for actuating a shutter according to the detection of such relative motion.

2. Description of the Prior Art

In the camera art it is well known that to obtain a properly exposed picture it is necessary to adjust the distance between the camera and an object to be photographed, as well as the aperture of the diaphragm and the shutter speed in due order. To facilitate the different adjustments modern cameras comprise automatic or coupled distance measuring equipment, as well as automatic light meters incorporated in the camera. Since only appropriate combinations of shutter speed, aperture of diaphragm, and sensitivity of film assure well-exposed pictures, these values have to be determined with respect to the brightness measured by a light meter.

Most modern high quality cameras, especially single-lens reflex cameras, comprise the afore-mentioned equipment as standard items. The main difference of such cameras is between the type of distance measuring equipment, e.g. double-image range finder or split-field range finder or combination range finder, and the light-meter type or system e.g. light meters of the internal or the external measuring type, comprising light-sensitive elements made of selenium or silicon, or being photo-conducting cells and the like. A further distinguishing characteristic is whether or not the light meter operates when the diaphragm is opened.

However, many users of modern cameras find it too complicated or inconvenient to be forced to adjust three different values manually, namely distance, shutter speed, and aperture of diaphragm, by turning setting rings before shooting a photograph.

To eliminate these objections and facilitate the handling of the cameras, improvements have been made recently which require the user to adjust only two values manually, namely distance and shutter speed or distance and diaphragm aperture. Thus, only the shutter speed or the diaphragm aperture, respectively, is the independent and manually adjustable value, whereas the diaphragm aperture or the shutter speed, respectively, is the automatically calculated and adjusted value.

Using these so-called semi-automatic cameras with an exposure system of the shutter speed-priority type or of the diaphragm aperture-priority type, most photographic problems can be satisfactorily solved, since most photographic shooting requires either certain exposure times to avoid movement blurs or certain diaphragm apertures to achieve a predetermined depth of focus.

Besides the semi-automatic cameras, so-called fully automatic cameras have also been developed which include a program ring comprising cams for controlling the adjustment of the shutter and the diaphragm. Through this means an exposure program is available which determines a special exposure combination as a function of the sensitivity of the film and of the light conditions. Under bad conditions of illumination, for instance, a relatively fast shutter speed and a relatively great diaphragm aperture are selected, since the emphasis of the program is upon the reduction of blurring rather than upon the achievement of a sufficient depth of focus. Only when the illumination conditions become better or even excellent, will the program allow a better depth of focus.

Some of the photographers consider it to be a disadvantage that these fully-automatic cameras do not afford them the opportunity to select the shutter speed or the diaphragm aperture manually, so as to achieve the best photographic results. Therefore, the fully-automatic system has not thus far been incorporated to a noticeable degree in high-quality cameras, despite the fact that the fully-automatic cameras using electronic control systems are very easy to handle (cf. German Pat. No. 2,353,924 and German Offenlegungsschrift Nos. 25 21 824, 25 34 656, 26 01 606).

It has also been proposed, however, to incorporate a more sophisticated control system in modern high quality cameras (cf. German Offenlegungsschrift No. 26 51 002). This proposal makes it possible to choose between a semi-automatic system having a shutter speed-priority and a semi-automatic system having a diaphragm aperture-priority.

This new system is conventional insofar as the only determining values are the sensitivity of the film and the brightness of the area to be photographed. Furthermore, it lacks the possibility of fully-automatic operation.

SUMMARY OF THE INVENTION

Accordingly, it is a general object of the present invention to overcome the disadvantages of the prior art.

More particularly, it is an object of the present invention to provide an improved fully-automatic system which does not have the disadvantages of the fully-automatic systems known from the prior art.

Another object of the invention is to make the operation of an automatic camera more flexible by providing two primary values (i.e. brightness and motion) for controlling the shutter and the diaphragm, instead of only one value (i.e. brightness).

A further object of the present invention is to incorporate the shutter and diaphragm control system in a camera comprising an automatic range determining and distance adjusting device, thereby making use of the same photoelectric elements.

Another object of the invention is to provide an automatic shutter and diaphragm control which is not limited to conventional cameras, but is also applicable to cameras with electrostatic reproduction systems or to cameras making instant photographs or to cameras comprising residual light amplifiers.

A concomitant object of the invention is to provide a shutter control for cameras using photo-sensitive means, the sensitivity of which is not dependent on the duration of the illumination.

A further object of the present invention is to operate the control system with electronic means, and more particularly with a programmable micro-processor.

An additional object of the invention is to provide a system which is compatible with all types of conventional semi-automatic or fully-automatic exposure control devices.

Yet a further object of the invention is to add the new system to well-known other systems in such a manner that it is possible to connect it to or disconnect it from such known systems.

In keeping with these objects, and with still others which will become apparent hereinafter, one feature of the invention resides in a system comprising means for checking the image field to be photographed for objects moving in the image field, means for metering the amount of movement of such objects in the image field, means for selecting the shutter speed as a function of the metered amount of movement, and means for operating the camera shutter in accordance with the selected shutter speed.

This system overcomes the disadvantages of of the prior art and achieves the aforementioned advantages in a novel manner. By incorporating the new system in a camera the photographer is enabled to use the camera as a semi-automatic system having a shutter speed-priority or as a semi-automatic system having an aperture-priority or as a fully-automatic camera, respectively, thereby connecting or disconnecting the new system to the well-known devices. The adaptation of the present invention is not limited to cameras measuring the illumination prior to, or during the opening of the shutter, or to cameras comprising an internal or an external device for measuring brightness.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a diagrammatic illustration of the optical reproduction of an object;

FIG. 2 is a view showing the edge of an optically reproduced object, together with photo-sensitive elements;

FIG. 3a is a front view of a sensor field comprising photo-sensitive elements;

FIG. 3b is a front view of a sensor field comprising the ends of light-conducting fibers;

FIG. 4 is a front view of an optical reproduction plane comprising a moving object;

FIG. 8 is a diagrammatic illustration of a logic circuit for detecting the movement of objects;

FIG. 9a is a front view of a conventional camera comprising a device for detecting the movement of objects;

FIG. 9b is a side view of the camera according to FIG. 9a, partly in a diagrammatic vertical section;

FIG. 10 is a diagrammatic view of a release knob;

FIG. 16 is a diagram of a third circuit embodiment; and

FIG. 17 is a graph explanatory of the operation of the embodiment in FIG. 16.

DESCRIPTION OF PREFERRED EMBODIMENTS

Figure 5:
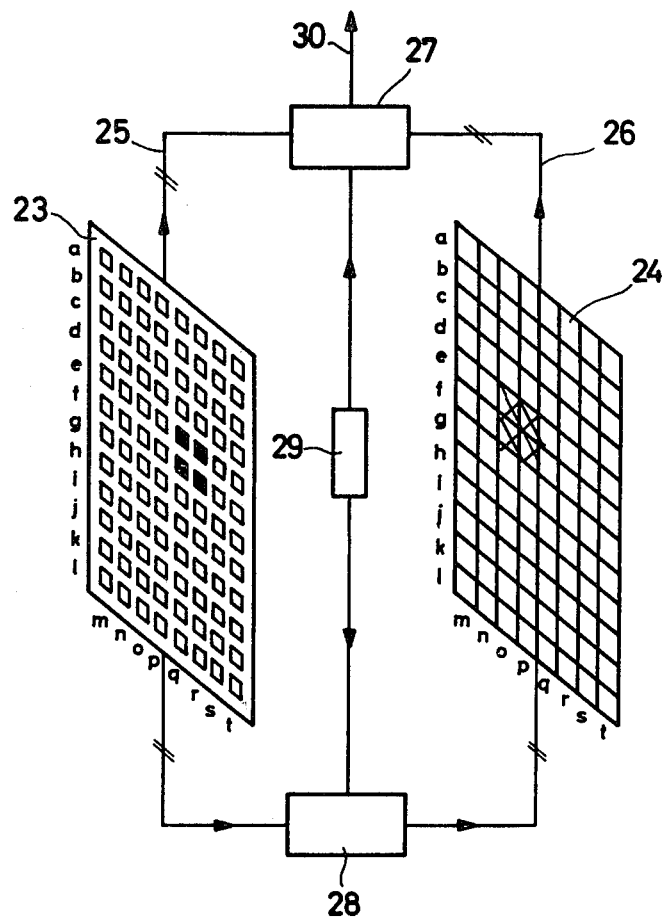
FIG. 5 is a diagrammatic drawing of a sensor field and a storage, both having a plurality of columns and lines.

FIG. 1 diagrammatically illustrates an object 1 being reproduced on an optical reproduction plane 2 which usually is the plane of the photographic film. To reproduce the object 1 sharply on the plane 2, the exposure time must be sufficiently short to assure that the distance covered by the object is smaller than the permissible degree of lack in sharpness, i.e., of blurring. This degree is defined by the so-called blur circle diameter which is based on the fact that the human eye is not able to recognize individual items which are observed under a visual angle smaller than 50 to 90 seconds of arc. This blur circle diameter is, with respect to 24 mm×36 mm cameras, s=0.03 mm, whereas it is s=0.05 mm with respect to medium scale cameras, i.e. 6 cm×9 cm cameras. The following formula describes the relationship between the necessary exposure time $t_B$ for obtaining a sharp picture, and other values:

$$t_B = s/(1000 \cdot v \cdot f'/a)$$

wherein s stands for the blur circle diameter, v means the velocity of the object 1, and f' means the focal distance. Finally, a is the distance between the camera and the object to be photographed.

Referring now again to FIG. 1, it will be noted that the object 1 is reproduced on the optical reproduction plane 2 as an imaging object 4 by means of a lens combination 3. The lens combination 3 is, in a well-known manner, symbolized by means of an external principal plane 5 and an internal principal plane 6. In multi-lens systems or in systems comprising heavy lenses, the distance between the object and the reproduction thereof, as well as the focal distances, are defined by these principal planes 5, 6. As focal distances f or f' of the lens combination 3 are designated, for example, the distances between the focusses F, F' and the coordinated external perspective center $H_1$ and the internal perspective center $H_2$, respectively.

Close to the imaging object 4 there is shown a distance s which corresponds to the above-mentioned blur circle diameter. The lower border 8 of the imaging object 4 shall not, according to the above explanation, cover more than the distance s. To avoid an unsharpness of the imaging object 4, sensor must be provided which detect the course of the imaging object. Furthermore, means for calculating the amount of movement and means for activating a shutter must be installed.

FIG. 2 shows, in particular, how this is achieved. The optical reproduction plane 2 as well as the imaging object 4 are illustrated in FIG. 2 on a larger scale. Usually, the optical reproduction plane 2 corresponds to the film plane of the camera. However, it is also possible to deflect the picture reproduced on plane 2 either partly or wholly to another location. FIG. 2 shows only as many photosensitive elements 9–19 as are necessary for our understanding of the operating principle. It will, however, be clear to those skilled in the art that any number of photosensitive elements can be provided all over the reproduction plane 2. In FIG. 2 eleven photosensitive elements 9–19 are provided over a distance corresponding to the blur circle diameter s. If the lower border 8 of the imaging object 4 moves downwards, it travels over the element 9, then over the element 10, etc. Finally the element 19 is darkened. The elements 9–19 can be connected to a logic circuit (not shown in FIG. 2) in such a manner that by means of this circuit it is possible to detect whether or not the lower border 8 has already passed the distance s. Furthermore, it is possible to determine the velocity of the lower border 8 by counting the number of photosensitive elements that are already covered by the border 8. The distance measured by this procedure is then divided by the time which was necessary to cover this distance. Thus, the speed results as a mathematical fraction or quotient of distance and time. If it is only of interest to know whether or not the distance s has been covered by the border 8, then it is sufficient to provide two photosensitive elements 9 and 19 in FIG. 2.

The principle shown in FIG. 2 can be used in cameras in different ways. On the one hand it is possible to determine the movement of the imaging object prior to the taking of an exposure and then to activate a shutter. On the other hand it is also possible to determine the shutter speed during the exposure procedure. The latter embodiment can be used, for instance, by opening the shutter and then determining the moment when the imaging object has reached the maximum permissible deviation, on the film plane or in the vicinity thereof or on a plane to which the imaging object is at least partly deflected. As soon as the limits of the maximum permissible deviation have been reached, the shutter is promptly closed.

The diagrammatic illustration of FIG. 2 implies some simplifications which, in the concrete circumstances, do not always exist. The imaging object 4, for example, it not always continuously black and thus does not always completely cover the photoelectric elements. It is in general, more or less dark. Furthermore, instead of only one moving object, a plurality of moving objects may be reproduced on the optical reproduction plane. With regard to these facts, the principle illustrated in FIG. 2 must be modified in several cases. Some of the modifications will be discussed hereinafter.

A first modification is shown in FIG. 3a which shows, by contrast with FIG. 2, a two-dimensional sensor field. This modification is chosen because in practice one-dimensional situations do not occur very often.

Sensor field 20 comprises a plurality of photosensitive elements 21, some of which are illustrated in FIG. 3a. These elements 21 are distributed all over the sensor field 20 and have, in principle, the same function as the photo-sensitive elements of FIG. 2, i.e., the light falling on them is converted into an electric current or voltage which, in turn, is scanned by scanners or the like. Sensor fields of the kind just described are well-known in the art (German Offenlegungsschrift No. 2,064,303, FIG. 2; German Offenlegungsschrift No. 2,244,340, FIG. 8; German Auslegeschrift No. 2,443,441, FIG. 3, No. 13; German Offenlegungsschrift No. 2,514,230, FIG. 1, 5, 7; German Auslegeschrift No. 2,611,576).

Up to now sensor fields have only been used for automatically adjusting the distance-setting of a camera by measuring the contrast. The deeper the contrast the better is the sharpness of an object reproduced. Thus, the contrast can be used as a criterion for controlling the distance focusing device. In the present invention the sensor field 20 is primarily used as a device for detecting the movement of objects.

In practice, several difficulties have to be overcome in solving the problem of movement detection. If, for example, a photograph of a landscape including a moving car is to be made, the whole of the imaging object is motionless except for the car itself. In order to avoid an at least partial unsharpness of the photograph the sensor field 20 has to be scanned completely.

In comparison with the prior-art automatic adjustment of the distance focusing device the contrast is, in the present invention, not the most important value for automatic detecting of the movement of objects; the most important value is the changing of the illumination as a function of the position. Since different colors, under certain circumstances, produce different intensities of brightness, color filters may be provided to eliminate any objectionable effects. If, for instance a red car is moving on a green outer field, the movement of the car might possibly not be detected because the brightness of the green outer field might accidentally be the same as the brightness of the red car. Although the technique of black and white photography has shown that the above-mentioned circumstances do not occur very often in practice, it is advantageous to provide two or three sensor fields instead of only a single one. The sensitivity of these sensor fields should have their maximum in different spectral regions, e.g., red, green, blue, and they should be covered by respective color filters. The sectional view of FIG. 3a shows a multi-layer sensor field, comprising a first color filter $F_1$ and a first sensor field $S_1$. Below the sensor field $S_1$ is provided a second color filter $F_2$ which is arranged above a second sensor field $S_2$. A third color filter $F_3$ and a third sensor field $S_3$ are provided at the bottom of the multi-layer sensor field. In order to let the light pass through, the photosensitive elements of the sensor fields $S_1$, $S_2$, $S_3$ are arranged in such a manner that they are not stacked one above the other, i.e. they are laterally displaced relative to one another.

In the following only the simplified one-layer sensor field 20 will be described, since this sensor field, comprising one layer of photosensitive elements 21, will be sufficient in most practical applications. It must be understood, however, that a multi-layer sensor field can be provided in any and all applications.

FIG. 3b shows a modification of the sensor field in FIG. 3a. Instead of the photosensitive elements used in FIG. 3, the embodiment of FIG. 3b uses glass fibers whose ends are illustrated at 21' in FIG. 3b. The light falling upon the ends 21' is conducted to operating circuits and devices not shown in FIG. 3b, but well-known per se in the art.

To detect the changing of contrast the output signals of adjacent elements are subtracted from each other in a first step. In a second step, either the differences are added or an all-over relative level is established. This level, divided by the number of photosensitive elements, is then compared to the output signal of each of the photosensitive elements. In a further step the differences of this comparison are added. This procedure of calculating the contrast is well-known in the art.

FIG. 4 again shows a sensor field 20, the sensors of which are not shown. The method of detecting the movement of objects will be described from another point of view with reference to FIG. 4. A circle 22 symbolizes the reproduction of an object which is the only moving part on the optical reproduction plane. This circle 22 moves from left to right. The right position of the circle is marked by the dotted-line circle 22'. When the circle 22 is in its left position it covers a plurality of the photosensitive elements which are registering a brightness different from the brightness of the outer field, if it is assumed that the brightness of the rest of the sensor field 20 is uniform. When the circle has reached its right position 22' only those photosensitive elements are supplied with a smaller quantity of light which are provided in the area of the circle 22'. The photosensitive elements in the area of the left position of circle 22 are now registering the normal brightness of the sensor field 20, which is stronger than the brightness in the area of the circle 22'.

To obtain an exact statement on the movement of objects the changing of the brightness sensed by the photosensitive elements must be recorded and processed. To solve the problems implied thereby several embodiments are practicable, one of which will now be described.

FIG. 5 shows a basic circuit diagram of a first embodiment and illustrates a sensor field comprising eight columns and twelve lines or rows, wherein the lines are designated as a . . . l and the columns are marked as m . . . t. A store 24 is coordinated to the sensor field 23, comprising as many storage units as the sensor field 23 comprises photosensitive elements.

The store 24 may be a store being capable of storing an analog signal, e.g. an analog sample, corresponding to the output signal of a photosensitive element. The store 24 may, however, also be a digital store capable of storing digital signals only, e.g. digital signals derived from analog samples. The analog-to-digital converter which would be necessary to convert analog signals into digital signals is not shown in FIG. 5, since these converters are well-known in the art. The sensor field 23 as well as the store 24 are connected to a comparator 27 via collecting lines or bus-bars 25, 26. Thus it is possible to scan each element of the sensor field 23 and each storage unit of the store 24. Both devices, e.g. sensor field 23 and store 24, are also connected to an input network 28 which is, in turn, connected to a pulse generator 29. It will be understood that the device called the comparator 27 for simplicity is, in actual fact, of a more sophisticated nature and might more properly be called an object-movement detecting circuit. It will be more fully described hereinafter.

Although hereinbefore called an input network, the circuit block 28 (and similarly the one which will later be described at 39 with reference to FIG. 6) might more properly be called a store control circuit which controls the "write" of the data into the store 24 and the "read-out" of the data stored in the store 24, presuming that the store 24 is a RAM (Random Access Memory) having a memory cell array in the form of a matrix of 12×8 in correspondence to the sensor field 23. More concretely, the circuit block 28 contains a column address counter and has a function for addressing each memory cell in the store 24 and a function for changing over the store 24 between a write mode and a read-out mode.

Assuming now that an imaging object is reproduced on the sensor field 23 of FIG. 5, and further assuming that an object is moving from the left to the right, the object will cover different photosensitive elements during its course of movement. In a first point of time, for instance, the photosensitive elements arranged at the crosspoints of lines and columns e/o, e/p, f/o and f/p are covered by the moving object. This information is now, by means of the input network 28, supplied to the store 24; i.e. the storage units e/o, e/p, f/o, f/p are occupied by this information as illustrated in FIG. 5. At the same time the states or conditions of the remaining photosensitive elements are also transmitted to the store 24. This latter situation, however, is of minor importance in the present instance, since by definition the imaging object shall not comprise further movements of objects.

When the state of the sensor field 23 has been transmitted to the store 24, it is possible to recognize the movements of the object since its original position has been stored in the store 24. The comparator 27 compares the state of occupancy of the store 24 which is a mapping of the state of the sensor field at the point of time $t_1$ with the state of the sensor field at the point of time $t_2$. If the comparator recognizes changes at some local positions, it may calculate the movement of the object. In the illustration shown in FIG. 5 the comparator will conclude, for example, that within the space of time $t_1-t_2$ the object has moved to the right from the positions e/o, e/p, f/o, f/p and is travelling to the positions e/q, e/r, f/q, f/r. Supposing that the distance between the photosensitive elements of the sensor field 23 is known, and further supposing that the admissible blur circle diameter is known as well, the comparator 27 can determine whether the object has moved inadmissibly far away or whether it is still within the periphery of the blur circle. As long as the border of the blur circle has not yet been passed, no switching action has to be effected. If, however, the object has reached or passed that border, certain devices may be controlled by the output 30 of the comparator 27 which, in turn, effect the controlling of the exposure time of a camera.

In order to detect even rapid movements the comparison itself must be repeated relatively often; i.e. the sensor field 23 and the store 24 must be scanned by a relatively high frequency and their contents must be forwarded repeatedly to the comparator 27. The scanning process can be performed in different ways, e.g. by scanning all photosensitive elements and storage units at one point of time in parallel. It is, however, also possible to scan the photosensitive elements and storage units successively or serially. Using the latter method it is possible to apply a purely serial procedure as is the case with the scanning of a television screen, or to apply a mixed procedure in which the contents of the sensor field 23 and the store 24 are scanned line-by-line (so-called parallel-serial method as described in the German Pat. No. 2,051,659).

To avoid adulterations of the values to be compared, it is possible to introduce a reference level which has to be taken into consideration. It may happen, for instance, that the changes of brightness at a local point of the sensor field are not caused by the movement of an object, but by alterations of the general ambient light. Such general alterations of brightness can be found by determining the sum of the total brightness and dividing it by the number of the photosensitive elements. Thus, a medium brightness per photosensitive element is obtained which can be subtracted from the actual brightness of the respective element. The difference in brightness can then be transmitted to the store 24.

The sequential operation of the embodiment shown in FIG. 5 may be summarized as follows:

At the time of first scanning of the output of the sensor field 23, the store control circuit 28 sets the store 24 to the write mode, so that the output of each photosensitive element which is produced at this first scanning, is stored in the memory cell having a corresponding address in the store 24. In this case, the appointment of the address of that memory cell in the store 24 in which the data is to be stored, is performed by the outputs of the column address counter and the row address counter in the store control circuit 28 in such a manner that the address of each memory cell in the store 24 corresponds to the address of each element in the sensor field 23.

Now, scanning of the output of the sensor field 23 is performed by the clock pulses supplied by the pulse generator 29. Further, both of the address counters in the store control circuit 28 count the clock pulses so as to produce an address signal. The output of the column address counter is decoded-out into the column address code by means of the column address decoder in the store 24 so as to select the column of the memory cell array, while the output of the row address counter is decoded-out into the row address code by means of the row address decoder in the store 24 so as to select the row of the memory cell array, and through this selection of the column and the row, the selection of one address in the memory cell is carried out. At the time of the first scanning of the sensor field 23, the object-movement detecting circuit 27 is in a state in which it is incapable of detecting the object movement, because no data is supplied from the store 24 although the output from the sensor field 23 is supplied thereto.

At the time of the second scanning of the output of the sensor field 23, the store control circuit 28 sets the store 24 to the read-out mode so as to read-out one by one the data stored in each memory cell in the store 24, having the same address as that of the sensorfield element from which the output is read out, in accordance with the read-out of the output of each photosensitive element. Now, at the time of the read-out of the data stored in the store 24, the selection of the address of each memory cell is performed in the same way as in the case of the write mode. The only difference is that in the former case the data is written while in the latter case the data is read-out. At the time of the second scanning of the output of the sensor field 23, the object-movement detecting circuit 27 carries out the detection of object movement as hereinbefore described, because the output of the sensor field 23 and the output data of the store 24 are supplied thereto synchronously.

The detection of object movement by means of the detecting circuit 27 will be explained later in detail with respect to FIGS. 6, 8 and 14. It will already be understood, however, that in the present invention the detection result at the time of the second scanning is stored in the detecting circuit 27, and the output of the sensor field 23 at the time of the next third scanning is compared with the data (corresponding to the output of the first scanning) stored in the store 24, and whether the object has moved or not is finally judged by a comparison of the second detection result with the first detection result.

Figure 6:
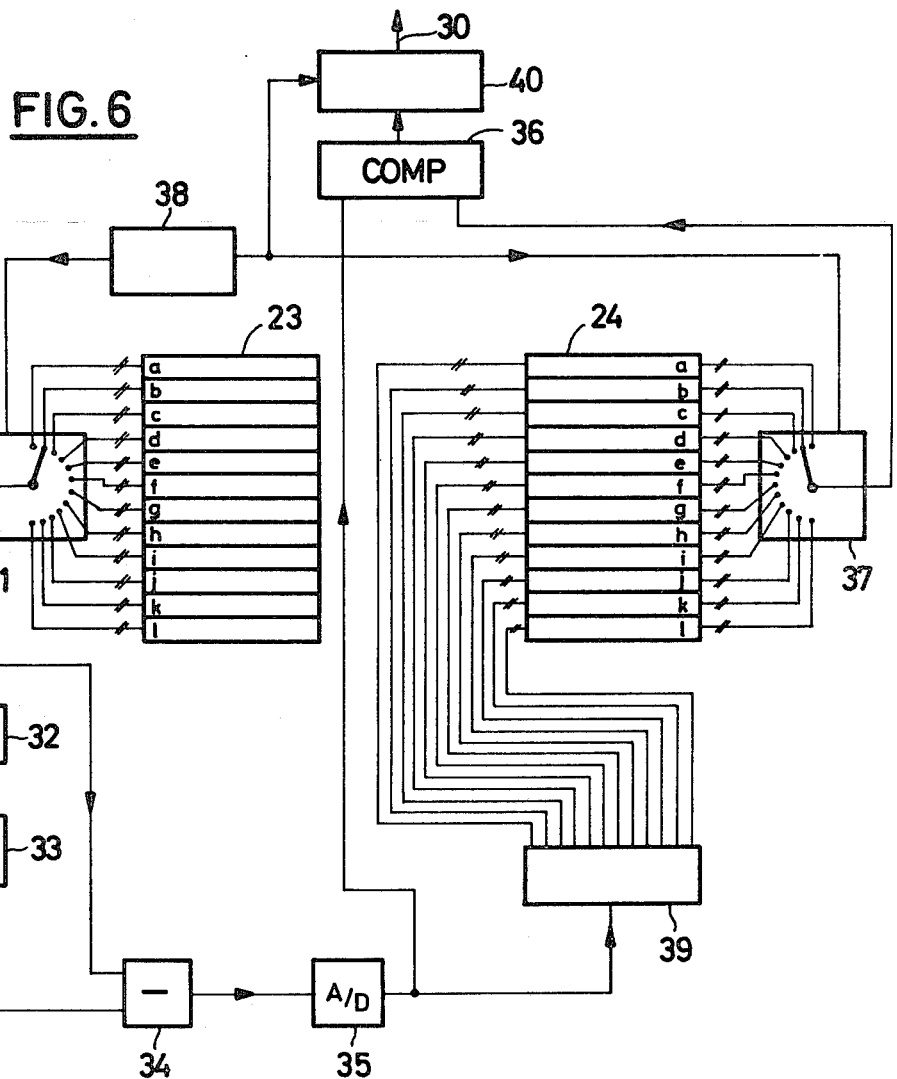
FIG. 6 is a diagrammatic illustration of an arrangement for recognizing the movement of an object.

FIG. 6 shows a sensor field 23 and a store 24, e.g. a RAM, both devices being scanned in a time-division multiple method. The lines a . . . l of the sensor field 23 are scanned successively, i.e. element by element, by means of a scanner 31. The values of these elements are then transmitted to a sum operator 32 in which the brightness values of all photosensitive elements (not shown in FIG. 6) of the sensor field 23 are added successively so that a total brightness value of the sensor field 23 is obtained. This total brightness value is then divided by the number n of all photosensitive elements of the sensor field 23 by the divider 33. Thus, a medium brightness of a photosensitive element is achieved which can alter corresponding to the outer light conditions. This medium brightness is now transmitted to a subtractor 24 which is also supplied with the actual brightness of each photosensitive element. The subtractor 24 calculates the difference between the actual brightness of a photosensitive element and the fictitious medium brightness of a medium photosensitive element and the resulting difference is then transmitted to an analog-to-digital converter 35, preferably each of the same sign. In the converter 35 the analog value of the difference is converted into a digital signal which is transmitted to a comparator 36 which is also supplied with the digital signal of the same photosensitive element by means of the scanner 37 that is controlled by the pulse generator 38, as is the case with the scanner 31. Thus, the pulse generator 38 causes the scanners 31, 37 to operate synchronously.

Although the device 36 has hereinbefore been described as a comparator (digital comparator) it will be understood that it constitutes an object-movement detecting circuit, corresponding to the element 27 shown in FIG. 5, together with the circuit block 40 (shown in detail in FIG. 8). The circuit block 36 serves to detect whether the output of the A/D converter 35 does or does not correspond to the data stored in the store 24 and obtained through the scanner 37, so as to produce an output (a high level signal) only when the output of the A/D converter 35 does not correspond to the data obtained through the scanner 37. Therefore, the circuit block 36 will may more properly be called "discordance detecting circuit" and this term will be employed hereafter.

As mentioned above the circuit 36 compares the brightness of each photosensitive element that refers to a definite level at a point of time $t_1$ with its brightness that also refers to a definite level but at a point of time $t_2$. If, according to this comparison, no changes have occured, it can be concluded that no object in the area to be photographed has moved. If, on the other hand, differences can be recognized, this fact indicates a locomotion which, of course, could also have been caused by a movement of the camera. To estimate the relevance of the locomotion the information calculated by the circuit 36 is transmitted to evaluation equipment (shown as a circuit block 40) where it is analyzed. If an alteration of any importance has taken place, a suitable operation can be initiated via the output 30. The circuit block 40 determines how many adjacent photosensitive elements have changed their respective brightnesses. This will be explained with the aid of FIG. 7.

Figure 7:
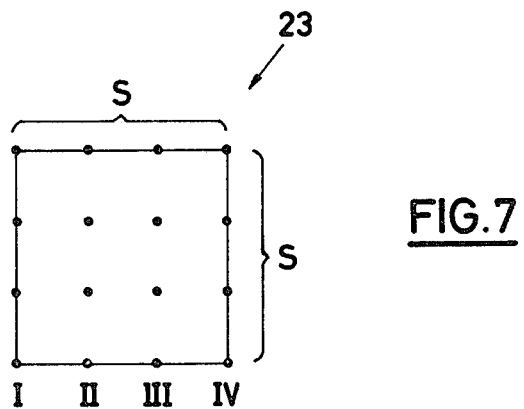
FIG. 7 is a partial view of the sensor field, having a diameter corresponding to the blur-circle diameter.

FIG. 7 depicts a blur circle diameter s in a vertical and horizontal direction. Four photosensitive elements are arranged in both directions, thus forming a sensor field 23 of sixteen photosensitive elements. If it is assumed that the right border of a moving body overlaps column I of the "blur square" and then moves to the right, a change of brightness of the photosensitive elements in column II can be determined in a next scanning cycle. This change of brightness does not necessarily actuate any circuits, since the change of brightness still lies within the blur square diameter. Only if in column III or even in column IV alterations of brightness occur, is it advantageous to actuate circuits. Vertical movements of objects are treated in a similar way as the horizontal movements described above.

The operation of the embodiment shown in FIG. 6 may be summarized as follows:

When the first scanning of the sensor field 23 has been carried out by means of the scanner 31 (according to the clock pulses from the pulse generator 38), the output obtained through the scanner 31 is supplied to the sum operator 32 which summarizes the output of all the photosensitive elements in the sensor field 23. This sum is divided by the total number n (96=12×8) of the elements in the sensor field 23 by means of the divider 33 so as to obtain the mean brightness data of the object. Now, at the time of the first scanning, supplying of the output obtained through the scanner 31 to the subtractor 34 is prevented, so that at the time of the first scanning the subtractor 34 produces no output. After the termination of the first scanning and before the start of the second scanning, the output of the divider 33 is supplied to the subtractor 34 which continues to receive it until the second scanning has been terminated.

When the second scanning of the sensor field 23 has been carried out, the output obtained through the scanner 31 is supplied to the sum operator 32 and at the same time to the subtractor 34, so that the sum operator 32 summarizes the output in the same way as in the case above mentioned, while the subtractor 34 produces the difference between the output of the sensor field 23 obtained by the second scanning and the mean brightness obtained at the time of the first scanning. The output of the subtractor 34 is then converted into digital data by means of the A/D converter 35 and thereafter supplied to the store control circuit 39 (whose construction and function are the same as those of the store control circuit 28 shown in FIG. 5).

At the time of the second scanning the store control circuit 39 has set the store 24 to the write mode, so that the output of the A/D converter 35 obtained at the time of the second scanning is stored in each memory cell of the store 24 having the address corresponding to each element in the sensor field 23, in the same way as explained with reference to FIG. 5.

Although omitted in the drawing, the store control circuit 39 is supplied with the clock pulses from the pulse generator 38 in the same way as described with reference to the store control circuit 28 shown in FIG. 5.

The output of the A/D converter 35 is supplied at the time of the second scanning to the discordance detecting circuit 36; however, the circuit 36 does not produce any output because at the time of the second scanning the scanner 39 for taking out the data stored in the store 24 does not produce any output.

Though the third scanning is carried out after the termination of the second scanning, hereat, after the termination of the second scanning and before the start of the third scanning, the mean brightness data supplied to the one input of the subtractor 34 is changed for the output of the divider 33, namely the mean brightness data obtained at the second scanning (it goes without saying that the data is kept until the termination of the third scanning). Further, at the time of the third scanning the store control circuit 39 has set the store 24 to the read-out mode.

Consequently, at the time of the third scanning, the subtractor 34 produces the difference between the output obtained through the scanner 31 at the third scanning and the mean brightness data obtained at the second scanning, and this difference is converted into digital data by means of the A/D converter 35 and then supplied to the discordance detecting circuit 36. On the other hand, at the time of the third scanning the digital data stored in each memory cell in the store 24 is taken out through the scanner 37 in synchronism with the scanning of the output of each element in the sensor field 23. Accordingly, the digital converted value of the output of each element in the sensor field 23 obtained at the third scanning, and the digital converted value obtained at the second scanning, are supplied to the discordance detecting circuit 36. The discordance detecting circuit 36, to which the output of the A/D converter 35 and the output data of the store 24 obtained through the scanner 37 are applied, detects whether both outputs correspond to each other and produces no output (or a low level signal) if both outputs do correspond to each other, while it produces an output (or a high level signal) only when the two outputs do not correspond to each other.

The scanner 37 now serves to take out serially the digital data (plural number bit data) stored in each memory cell in the store 24 in accordance with the clock pulses from the pulse generator 38. Also at the third scanning, the mean brightness is detected by means of the blocks 32 and 33.

When the discordance detecting circuit 36 produces a signal indicative of the fact that the outputs (which are inputs to the circuit 36) do not correspond to each other, this means that the object image has moved in the sensor field 23 between the second scanning and the third scanning. The object movement is evaluated in more detail in the evaluation equipment 40 on the basis of the output of the discordance detecting circuit 36. Although the evaluation of the object movement by means of the evaluation equipment 40 will be explained later in detail with reference to FIGS. 8 and 14, as explained at FIG. 5, in the present invention the fourth scanning is carried out after the termination of the third scanning. The discordance detecting circuit 36 again detects whether the output of the A/D converter 35 at the fourth scanning and the data stored in the store 24, namely the data obtained at the second scanning, correspond or do not correspond to each other, and the output of the discordance detecting circuit 36 at the fourth scanning and the output of the discordance detecting circuit 36 at the third scanning are compared to each other so as to finally judge whether the object has moved or not.

FIG. 8, however, depicts some elements of said evaluation equipment 40 which are significant for the embodiment of FIG. 6. This evaluation equipment 40 comprises a ring counter 41 stepped by an impulse generator 38 and including as many counting positions as photosensitive elements are available. Thus, the counting position indicates which of the photosensitive elements has changed its state of brightness during a scanning cycle. If an outgoing pulse is transmitted from the circuit 36, the gate circuit 42 is closed and this means that the output number of the counter 41 is forwarded to the calculating device 43. The device 43 calculates, for example, the numbers of the positions of three photosensitive elements which are vertically adjacent to the photosensitive elements having changed their states of brightness, and the numbers of the positions of three photosensitive elements which are horizontally adjacent to the photosensitive elements having changed their states of brightness. These numbers are stored in the stores 44, 45, 46 (horizontal movement) and in the stores 47, 48, 49 (vertical movement). In the next scanning cycle the gate circuit 42 is closed again and the output number of the ring counter 41 is transmitted to the inputs of the identity operators 50, 51, 52 and 53, 54, 55, respectively. Those identity operators 50-55 transmit output signals only when the two signals at the inputs are identical. Dependent on the conditions under which a circuit activation is advantageous, the activation can be carried through if an output signal is available at one or two or three identity operators of a column or a line.

The present invention is not limited to the above mentioned scanning and evaluation devices. Other methods and arrangements well-known in the art may be used, e.g. the techniques of differential pulse code modulations or the like as applied in video transmission systems (U.S. Pat. Nos. 3,470,313; 3,461,231; Proceedings of the IEEE, Vol. 60, No. 7, July 1972, p. 792-799; The Bell System Technical Journal, Feb. 1971, p. 495-478; Australian Telecommunication Research, Vol. 5, No. 2, November 1971, p. 27-33).

It should be noted in connection with FIG. 8 that the ring counter 41 has the same number of counting stages (namely, 96 bits) as that (n=96) of the element in the sensor field 23. The counter 41 counts up by the clock pulses supplied from the pulse generator 38 and returns to the initial state, namely 1 count state, at the 97th count. Accordingly, the output of the counter 41 shows the address of the scanned photosensitive element in the sensor field 23, in digital data (namely by means of the bit at which "1" stands in the 96 bits). The count output of the counter 41 is then taken out parallely.

Basing upon the above, the evaluation of the object move by means of the system shown in FIG. 8 will now be explained in detail, following the explanation given at FIG. 6.

At the third scanning, though the discordance detecting circuit 36, when it detects a discordance between the two inputs it receives, produces a certain determined output (a high level output), the gate circuit 42 is closed by the output of the discordance detecting circuit 36. Accordingly, the output of the counter 41, namely, the data concerning the address of the sensor-field element whose outputs are discordant between the second and the third scannings, is supplied to the calculating device 43. This operation is repeated until the third scanning has been terminated. Consequently, at the time point at which the third scanning has been terminated, the address data of all the elements whose outputs are discordant (such elements are called "discordant" elements hereafter), have been supplied to the calculating device 43. Further, the output of the counter 41, obtained through the gate circuit 42, namely the data of the address of the "discordant" elements, is also delivered to the identity operators 50-55. However, at this time no data is stored in the stores 44-49, so that no output is delivered from the identity operators 50-55.

Between the termination of the third scanning and the start of the fourth scanning the calculating device 43 (to be explained later in detail according to FIG. 14) detects the three continued addresses in the address data of the "discordant" elements along the horizontal direction (namely, m, n o; n, o, p; —represented by column address along the row direction) and along the vertical direction (namely, a, b, c; b, c, d; —represented by row address along the column direction), and then the three continued addresses detected at first along the horizontal direction and along the vertical direction are stored in the stores 44, 45 and 46 (for the horizontal direction) and in the stores 47, 48 and 49 (for the vertical direction), respectively. At this time these stores 44-49 have come to produce the address data in digital word with 96 bits parallely to each of the identity operators 50-55 in the same way as in case of the ring counter 41.

It will be understood that the three continued addresses are merely one example. The reason is that in case of the present invention, as is explained according to FIG. 7, 4×4 pieces of photosensitive elements exist in a blur circle. Namely, even if an object movement takes place in one or two continued addresses, it is merely a comparatively small change within the blur circle. For example, it is very probable that such could be due to random noise, and at any rate, such has little influence on the actual photographing. Therefore, in the present invention, three continued addresses which are little smaller than the blur circle are evaluated, and it is regarded that an object movement undesirable for photographing will have occurred in case the change has taken place in at least three continued addresses.

Through the above mentioned operation it is detected at which place in the sensor field 23 an object movement undesirable for photographing has taken place, although in the present invention the first detection result is not treated as the final result, but the discordance detection is again carried out for purposes of confirmation. Through the comparison of this second detection result with the first detection result (stored in the stores 44-49) by means of the identity operators 50-55, the object movement undesirable for photographing is finally detected. Namely, after the termination of the third scanning, three continued addresses of the "discordant" elements are detected as mentioned above and stored in the stores 44-49, and thereafter the system starts the fourth scanning. Also at the time of the fourth scanning, the circuit 36 detects whether the output data of the A/D converter 35 and the data (at the second scanning) stored in the store 24 correspond to each other, and at this time the address data of the "discordant" elements is taken out through the gate circuit 42. The address data of the "discordant" elements at the fourth scanning are supplied to the identity operators 50-55, which compare the address data with the address data stored in the stores 44-49 and produce outputs when the address data corresponding to the stored address data are detected. As will be explained later in detail with reference to FIG. 15, the outputs of the identity operators 50-55 are stored in the corresponding memory means, such as flip-flops.

Further, at the time of the fourth scanning the operation of the calculating device 43 is stopped, so that no response takes place for the address data of the "discordant" elements. Through the above mentioned operation it is detected whether the image movement at a certain time point, namely, at the third scanning, has taken place at the same location in the sensor field 23 as at the next time point, namely, at the fourth scanning. Consequently, when the identity operators 50-55 produce outputs it is judged that the image has moved. In this case all of the identity operators 50-55 do not always produce an output. The reason is that, at the second detection and depending upon the direction, the pattern and so on of the image, the image movement is detected by only a part of the addresses and not all of the addresses detected at the first detection. Therefore it is more preferable, for example when more than three of the six identity operators 50-55 produce outputs, for the exposure time to be changed over from the set value to a certain determined time (1/500 sec etc.).

Details of the calculating device 43 mentioned above, and its operation, will now be described with reference to FIG. 14.

Figure 14:
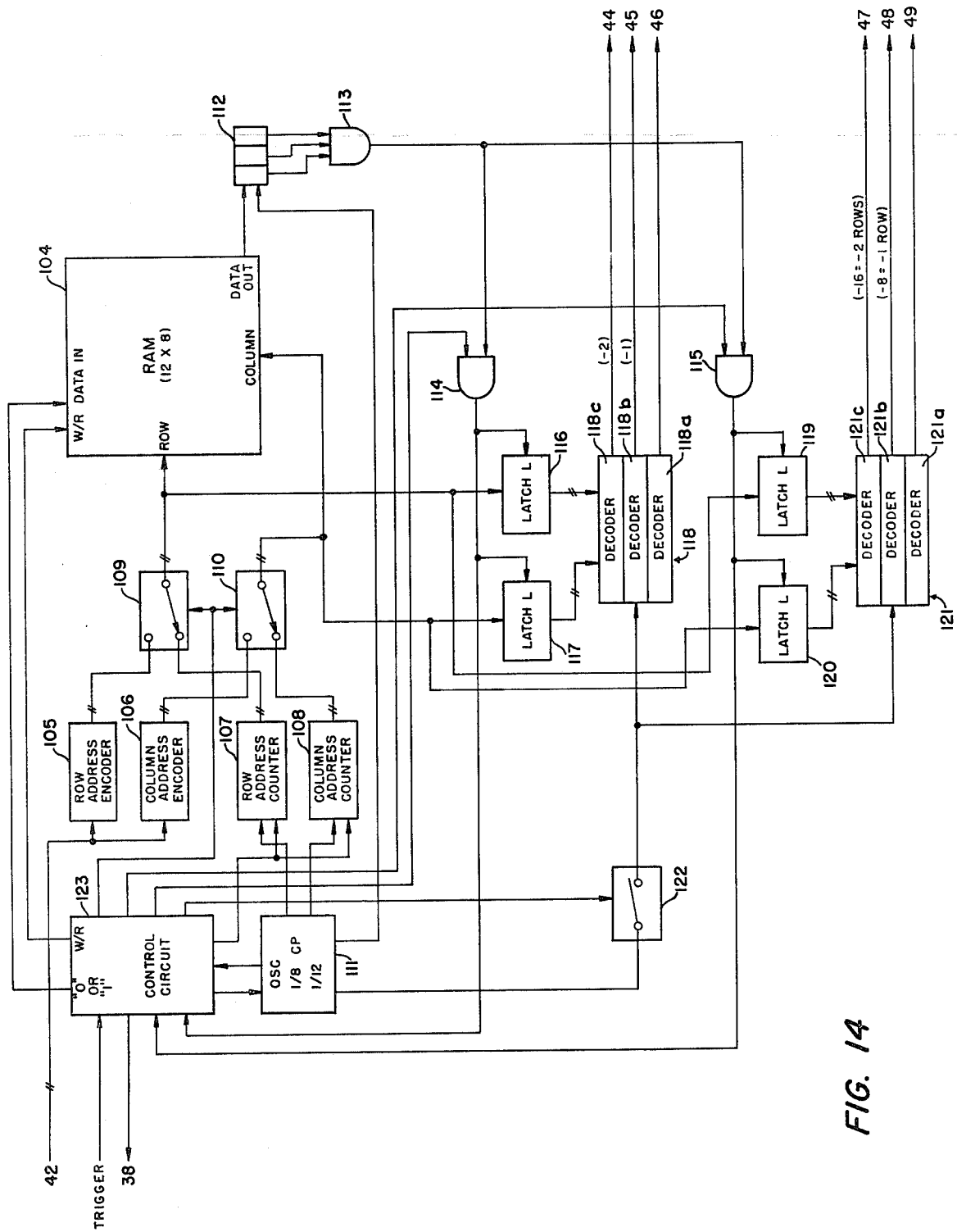
FIG. 14 is a diagram of a first circuit embodiment.

In FIG. 14, 104 is a RAM for memorizing the discordance address detected at the third scanning, presenting a memory cell array in the form of matrix with 12 rows and 8 columns, the same as in the case of store 24. The above mentioned discordance address is memorized in RAM 104 by storing "1" in the memory cell positioned at the address represented by the output of the ring counter 41 taken into through the gate circuit 42.

105 and 106 are a row address encoder and a column address encoder for converting the output of the ring counter 41 taken out through the gate circuit 42, into address codes by which the RAM 104 is accessible, wherein the output code of the encoder 105 is given to a row address decoder of the RAM 104 through a select gate 109 so as to select the row addresss, while the output code of the encoder 106 is given to a column address decoder of the RAM 104 through a select gate 110 so as to select the column address. Specifically, the row address encoder 105 divides the parallel data of 96 bits from the counter into 12 groups of 8 bits unit so as to detect the bit at which "1" stands, and produces such a code as to select the row corresponding to the bit number in the 12 groups of 8 bits unit, in which bit "1" stands.

Namely, if "1" stands at the first bit (namely, the bit represented by "1+8(M−1)" in some group of 8 bits, wherein M=1, 2, —12), the encoder 105 produces such a code as to select the first row of the memory cell array in the RAM 104, and if "1" stands at the second bit in some group of 8 bits, the encoder 105 produces such a code as to select the second row of the memory cell array. The column address encoder 106, on the other hand, divides the above mentioned 96 bit parallel data into 8 groups of 12 bit units so as to detect the group having a bit at which "1" stands, and produces such a code as to select the column corresponding to the group number in 8 groups of 12 bit, having a bit at which "1" stands. Namely, if "1" stands at any bit in the first group of 12 bits, the encoder 106 produces such a code as to select the first column of the memory cell array in the RAM 104, and if "1" stands at any bit in the second group of 12 bits, the encoder 106 produces such a code as to select the second column of the memory cell array.

Accordingly, by means of the output codes of the both encoders 105 and 106, a memory cell having the address represented by the output of the ring counter 41 is selected and the discordance address is memorized in this memory cell by standing "1" at the same cell, as will be explained later.

Reference numerals 107 and 108 designate a row address counter and a column address counter serving to select the address of the RAM 104 independently of the above mentioned encoders 105 and 106, wherein the output of the counter 107 is supplied to the row address decoder of the RAM 104 through the select gate 109, while the output of the counter 108 is supplied to the column address decoder of the RAM 104 through the select gate 110.

Reference numeral 111 is a pulse output circuit for supplying clock pulses to the counters 107 and 108. It comprises an oscillation circuit (OSC) and outputs for the clock pulses of the OSC, namely clock pulses whose frequency is divided by 8 and clock pulses whose frequency is divided by 12. The above oscillation circuit produces clock pulses whose frequency is by far higher than that of the pulse generator 38 shown in FIG. 6. that of the pulse generator 38 shown in FIG. 6.

Reference numeral 112 designates a serial in-parallel out shift register of 3 bit construction for storing the read-out output of the RAM 104 by 3 bits, which is driven by the output pulses of the pulse output circuit 111 in synchronism with the access timing at the time of read-out of the RAM 104. Reference numeral 113 is an AND gate which produces "1" when all of the bit output becomes "1", and 114 is an AND gate which produces "1" when both the output of the AND gate 113 and a control signal supplied from a control circuit 123 (to be explained later) becomes "1". 116 and 117 are latch circuits for latching the output codes of the select gates 109 and 110 in response to the "1" output of the AND gate 114. Numeral 118 designates a decoder circuit for decoding the address codes latched by the latch circuits 116 and 117 into digital address data of 96 bits, similar the output of the above mentioned ring counter 41. The decoder 118 comprises a first decoder 118a for directly decoding the output of the latch circuits 116 and 117 and a second and a third decoder 118b and 118c for decoding the outputs of the latch circuits 117 and 118 into the address data respectively representing the address earlier by 1 and 2 address rows than the address represented by the output address data of the first decoder 118a. The outputs of the decoders 118a, 118b and 118c are serially taken out by the clock pulses of the oscillation circuit supplied from the pulse output circuit 111 through the gate circuit 122, and are stored in the stores 46, 45 and 44, respectively. Numeral 115 is an AND gate which produces "1" when both the output of the AND gate 113 and a control signal supplied from the control circuit 123 become "1". Numerals 119 and 120 designate latch circuits like the above-mentioned latch circuit 116 and 117. Numeral 121 designates a decoder circuit like the decoder circuit 118, which comprises a first decoder 121a for directly decoding the outputs of the latch circuits 119 and 120 and a second and a third decoder 121b and 121c for decoding the outputs of the latch circuit 119 and 120 into the address data, respectively, representing the earlier 8 and 16 address, namely, the address earlier by 1 and 2 address rows than the address represented by the output address data of the first decoder 121a. The outputs of the decoders 121a, 121b and 121c are serially taken out by the clock pulses of the oscillation circuit supplied from the pulse output circuit 111 through the gate circuit 122, and are stored in the stores 49, 48 and 47, respectively. (Although not explained at FIG. 8, each of the stores 44-49 outputs the data of 96 bits parallely.)

Finally, 123 is a control circuit for controlling the RAM 104, the select gates 109 and 110, the pulse output circuit 111, the AND gates 114 and 115, the gate circuit 122 and the pulse generator 38 shown in FIG. 6 so as to control the whole sequence according to the output pulses of the oscillation circuit in the pulse output circuit 111. In the above mentioned construction, when a trigger signal is supplied to the control circuit 123 in order to detect the object movement, the control circuit 123 triggers the oscillation circuit in the pulse output circuit 111 in response to the trigger signal in such a manner that the sequence to be explained later is controlled in accordance with the output signal of the oscillation circuit. Namely, at first the control circuit 123 on the one hand triggers the pulse generator 38 so as to start the first scanning, and on the other hand sets the RAM 104 to the write mode and supplies the data "0" to the RAM 104; further, it sets the select gates 109 and 110 at the side of the data bus-bar "a" and supplies the output pulses of the above-mentioned oscillation circuit to the column address counter 108 and the pulses (whose frequency is divided by 12) to the row address counter 107. Thus, the data "0" is stored in all of the memory cells in the RAM 104. The above operation is terminated when or before the first scanning has been completed. After that, the control circuit 123 stops the supplying of pulses from the pulse output circuit 111 to the counter 107 and 108, and places the system shown in FIG. 14 in a state ready for operation.

After termination of the first scanning, the control circuit 123 once stops the pulse generator 38 and triggers it after elapse of a certain determined time so as to start the second scanning. (Accordingly, if the sensor field 23 is an image sensor such as CCD, MOS photodiode array and so on, this time lag is the integrating time.)

After the termination of the second scanning, the control circuit 123 again stops the pulse generator 38 and changes over the select gates 109 and 110 from the data bus-bar "a" to the data bus-bar "b" and supplies the data "1" to the RAM 104 before the start of the third scanning. At the time of the third scanning, the "discordant" element is detected by the discordance detecting circuit 36 and the output of the ring counter 41, namely, the address data of the "discordant" element is taken out through the gate circuit 42 as explained above. In this case the address data is converted by the encoders 105 and 106 into the code for accessing the RAM 104 as explained above, so that the data "1" is stored one by one into the memory cell of the address corresponding to the "discordant" element. At the termination of the third scanning, "1" is stored at the memory cells in the RAM 104 of the address corresponding to the photosensitive elements at which the discordance is detected, while "0" is stored in the memory cells of the address corresponding to the elements at which no discordance is detected.

After the termination of the third scanning the control circuit 123, on the one hand, stops the pulse generator 38, and on the other hand sets the RAM 104 to the read-out mode, and further changes over the select gates 109 and 110 from the data bus-bar "b" to the data bus-bar "a", and supplies the output pulses of the oscillation circuit of the pulse circuit 111 to the column address counter 107 and the shift register 112 and the pulses whose frequency is divided by 12, to the row address counter 108. In this way, the data stored in the RAM 104 is read out one by one along the direction of the row, namely horizontally, and at this time only 3 bits are always stored in the shift register 112, and the AND gate 113 detects whether the 3 bits data are all "1" or not.

On the other hand, at the time of the read-out along the direction of the row, the control circuit 123 normally supplies the AND gate 115 with a low signal and the AND gate 114 with a control signal which takes a low level only when the data stored in the memory cell at the address selected by the lines b−1 and columns m, n, namely in the memory cell at b/m, b/n, ... 1/m, and 1/n are read out, and which takes a high level otherwise. Namely, at the time of the read-out along the direction of the row, when all of the bits of the shift register 112 are "1" and the output of the AND gate 113 becomes "1", this means that three continued discordant addresses take place along the horizontal direction in the discordant addresses; however, even if the last address in each line is continued to the first address in the following line as the addresses on the line, the former is the right-most one while the latter is the left-most one from the view point of the spatial location on the sensor field 23. Accordingly, even if three continued discordance addresses are detected between the addresses in different lines, namely between the columns s-t-m and t-m-n, the detection must be incorrect. Accordingly, in this case, the control signal to be supplied to the AND gate 114 is controlled as explained above. At the time of the read-out of the data stored in the RAM 104 along the direction of the row, when the output of the AND gate 113 becomes "1" for the first time while the control signal for the AND gate 114 is high, the output of the AND gate 114 becomes "1", so that the latch circuit 116 and 117 come to latch the outputs of the select gates 109 and 110, namely the outputs of the counters 107 and 108. Further, when the output of the AND gate 114 becomes "1", the control circuit 123 clears the counters 107 and 108 and at the same time supplies the output pulses of the oscillation circuit to the row address counter 107 and the pulses whose frequency is divided by 8, to the column address counter 108. Thus, the data stored in the RAM 104 is now read out one by one along the direction of the column, namely, vertically, and at this time only 3 bits are always stored in the shift register 112, and whether all the 3 bit data is "1" or not is detected by means of the AND gate 113.

At the time of the read-out along the direction of the column, the control circuit 123 normally supplies the AND gate with a low signal and the AND gate 115 with a signal which takes a low level when the data stored in the memory cells at the addresses appointed by the lines, a, b, and the columns n-t, namely a/v, b/v, —a/t, b/t are read out, and which otherwise takes a high level. Namely, at the time of the read-out along the column, when all bits in the shift register 112 are "1" and the output of the AND gate 113 becomes "1", this means that three continued discordance addresses take place vertically, in the discordant addresses; however, as is explained in the case of the read-out along the row direction, even if the last address in each column is continued to the first address in the following column as the addresses on the column, they are distant from each other from the view point of the vertical spatial location on the sensor field 23. Therefore, even if these continued discordance addresses are detected between lines k-1-a and 1-a-b, the detection must be incorrect. Accordingly, in this case, the control signal to be supplied to the AND gate 115 is controlled as explained above.

At the time of the read-out of the data stored in the RAM 104 along the direction of the column, when the output of the AND gate 113 becomes "1" for the first time, while the control signal for the AND gate 115 is high, the output of the AND gate 115 becomes "1", so that the latch circuits 119 and 120 latch the outputs of the select gates 109 and 110, namely the output of the counters 107 and 108. Further, when the output of the AND gate 115 becomes "1", the control circuit 123 interrupts the supply of pulses from the output circuit 111 to the counters 107 and 108 and the shift register 112 and at the same time clears the counters 107 and 108, and then closes the gate circuit 122 in order to supply the output pulses of the oscillation circuit in the pulse output circuit 111 to the decoder circuits 118 and 121.

Thus, the decoders 118a, 118b and 118c in the decoder circuit 118 serially deliver the three horizontally (namely, along the row direction) continued digital address data of 96 bits in the same way as in the case of the ring counter 41. Namely, the data latched by the latch circuits 116 and 117 when the three continued discordant addresses are detected at the time of read-out of the RAM 104 along the direction of the row, is the last address in the three continued discordant addresses, so that when the data of this last address is decoded out by the decoder 118a, while the addresses (−1) and (−2) from said last address are decoded out by the decoder 118b and 118c, after all the data for the three continued discordant addresses along the horizontal direction can be obtained. The decode-out outputs of the decoders 118a, 118b and 118c are respectively stored in the stores 46, 45 and 44 as the data for the horizontal object movement. At this time, on the other hand, the decoders 121a, 121b and 121c in the decoder circuit 121 serially deliver the three vertically (namely, along column direction) continued digital address data of 96 bits in the same way as in the case of the ring counter 41. Namely, the data located by the latch circuits 119 and 120 when the three continued discordant addresses are detected at the time of the readout of the RAM 104 along the direction of the column, is the last address of the three continued discordant addresses, so that, when the data for the address is decoded-out by the decoder 121a, while the data for the addresses (−1 row) and (−2 row) from said last addresses are decoded out by the decoders 121b and 121c, and thus the data for the three vertically continued discordant addresses can be obtained. The decode-out output of the decoders 121a, 121b and 121c are respectively stored in stores 49, 48 and 47 as the data for the vertical object movement. All of the above mentioned process is completed between the termination of the third scanning and the start of the fourth scanning. After the lapse of a certain determined time following the termination of the third scanning, the control circuit 123 triggers the pulse generator 38 so as to start the fourth scanning. At the start of the fourth scanning the control circuit 123 stops all the operation of the system shown in FIG. 4. Thus, even when the "discordant" elements are detected by the discordance detecting circuit 36 and the data for the addresses is taken out through the gate circuit 42, the system shown in FIG. 14 does not make any response to the address data and the identity of the address data is detected by the identity operator 50-55.

FIG. 9 shows a camera 56 and, in particular, FIG. 9a is a front view thereof whereas FIG. 9b shows a side view. The housing of the camera 56 comprises a a lower part 57 including an objective, and an upper part 59 including a coincidence-type range finder and a motion detector 61 according to the present invention. A film-movement mechanism is also provided on the upper part 59 and includes a rapid wind lever 63 and a sensor lever release 64. The sensor lever release 64 has a double function: when it is touched a first switching action is initiated and when it is pushed down a second switching action can be carried out.

As can be seen from FIG. 9b, which illustrates the camera 56 with the upper part 59 shown in vertical section, a lens 66 is arranged behind a protective transparent window 65. Lens 66 is movably arranged on guideways 67. A sensor field 68, corresponding to the sensor field 23 of FIG. 5, is provided opposite to lens 66.

The function of the automatic exposure device by means of the motion 61 will now be described in connection with the camera 56 of FIG. 9.

When a photographer is looking through the coincidence-type range finder 60, he can adjust the exact distance by turning the adjusting ring 69, whereby the lens is guided on the guideways 67. The coupling between the lens and the adjusting ring 69 is illustrated by the dotted lines 69'. When the object to be photographed has been sharply reproduced on the optical reproduction plane, it is also reproduced on the sensor field 68 in the same way. Thus, eventual adulterations which may occur during the scanning of the photosensitive elements and which may be caused by unsharp reproductions on the sensor field 68, are eliminated.

As soon as the adjustment of distance has been carried through, the exposure procedure can be initiated. For this purpose the sensor release 64 is to be touched in a first step. When the sensor release 64 is touched, the scene reproduced on the sensor field 68 is scanned in the manner just described, whereby the scanning procedure can be repeated several times within the period of one second. Usually, the sensor field 68 is scanned until the second switching action is initiated by means of the sensor release 64.

FIG. 10 is a diagrammatic illustration of the sensor release 64 which is incorporated in the upper part 59 of the camera housing. This release 64 comprises a sensor plate 70 which has to be touched in order to initiate a first switching action, and two terminals 71 of lines which can be connected to each other by means of the contact shank 72, thus establishing a second switching action. For easier understanding the lines connected to the terminals 71 are not shown in FIG. 10. The sensor release 64 also comprises a collar 73 around its contact shank 72. Opposite this collar 74 a ring 74 is provided which is connected to the housing of the camera. A spring 75 is located between the collar 73 and the ring 74, keeping the sensor release 64 in its upper position when not being operated. A second switching action is initiated when the contact shank is pushed down and thus establishes a connection of the two terminals 71.

Accordingly, the exposure is carried out by touching the sensor plate 70 and thus initiating the scanning of the sensor field. By this scanning procedure it is determined whether or not an object is passing the borders of the blur circle diameter. Prior to the passing of said border the shutter of the camera will be closed.

In order to achieve a sharp photograph it is important, as mentioned earlier, that the object does not pass the blur circle diameter. It is, in a first approach, of no importance within which space of time the blur circle diameter is being passed. In practice, however, the time factor is relevant, since the sensitivity of the film depends on the rule of Bunsen and Roscoe which says that the photochemical effect of a radiation depends on the product of the light intensity and the duration of light radiation. Accordingly, it is not possible to detect and evaluate the speed of an object within an arbitrary space of time. Otherwise the film could be bleached out before the shutter will have been closed.

In order to avoid the above-mentioned disadvantage, the sensor field 68 (FIg. 9b) is, for example, scanned at intervals of 1/100 seconds. Providing those distances between the photosensitive elements as are shown in FIG. 7 it could happen that an object has proceeded from a first photosensitive element to the next within one scanning cycle. This means that a shutter speed of 3/100 seconds will still result in a sharp photograph, since only after this space of time the border of the blur circle will have been passed, assuming a constant velocity of the moving object. By using a sensor field of the kind described above it is possible to meter the over-all brightness (integral measurement). Thus, knowing the sensitivity of the film, the aperture of the diaphragm corresponding to a shutter speed of 3/100 seconds can be calculated. The calculation of the aperture of the diaphragm is carried through within a negligible space of time, so that immediately after the first scanning cycle the relevant values are available, e.g. 1/30 seconds/aperture 11. Now the camera can automatically adjust these values in a well-known manner.

The release of the shutter usually is only initiated when the sensor release 64 (FIG. 10) has bridged over the terminals 71. Assuming that for physiological reasons 1/10 seconds will pass from the moment when the sensor release 64 is touched to the moment when the terminals 71 are bridged over, then ten scanning cycles of 1/100 seconds each can be carried through within this time period of 1/10 seconds. Thus, ten data on the movement of objects are acquired which make it possible to calculate the average speed of the objects and the necessary shutter speed.

In order to recognize fast objects, too, a scanning interval of 1/1000 seconds is advantageous, the more so as 1/1000 seconds is the usual maximum shutter speed of high-quantity cameras. For physiological reasons it is hardly possible to move the contact shanks 72 to the terminals 71 by the aid of the one's fingers faster than within 1/100 seconds. This means that at a scanning interval of 1/1000 seconds at least ten scanning cycles can be carried out prior to the actual release of the shutter.

The method described in connection with a conventional camera can, in principle, also be used in single-lens reflex cameras or in cameras taking motion pictures and having a time variable film stepping device.

Figure 11:
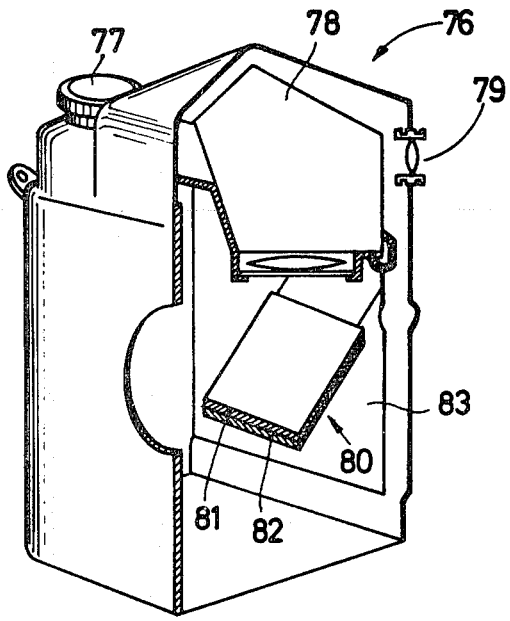
FIG. 11 is a partial view of a single-lens reflex camera.

FIG. 11 illustrates an embodiment to be used in a single-lens reflex camera 76. The camera 76 is illustrated in a sectional view and comprises a motion detector. Furthermore, the camera 76 comprises a well-known film transporting mechanism 77, a view finder prism 78, an eye-piece 79 and a surface mirror 80. The surface mirror 80, however, consists of two layers, i.e. of a dichroic mirror 81 having a remission factor of 90% and a transmission factor of 10% and of a sensor field 82 which is arranged below the dichroic mirror 81.

The process of automatic exposure of the camera illustrated in FIG. 11 is as follows: In a first step the distance is adjusted by turning the objective. Then a release knob, not shown in FIG. 11 and which does not necessarily comprise a sensor plate, is operated. By pushing down the release knob the mirror 80 is pivoted backwards until it is parallel to the plane of the film 83. In this position the sensor field, which receives about 10% of the light falling upon the mirror 80, is scanned at a frequency of 1000 cycles per second. The electrical lines, necessary for scanning the sensor field 82, are connected to the suspension of the mirror 80 and to the sensor field 82. In this position parallel to the plane of the film 83, the mirror 80 may remain for about 1/10 seconds. During this space of time the scanning procedure is carried out in the same way as already described in connection with a conventional camera. The exposure time and the aperture of the diaphragm, both calculated by known equipment (see e.g. U.S. Pat. No. 3,399,307, item 18 and FIG. 2), are stored while the mirror 80 is turned to its upper position in a well-known manner. When the mirror 80 has been moved out of the path of light rays travelling between the objective and the plane of the film 83, the shutter is opened for the time calculated before.

Figures 15, 18:
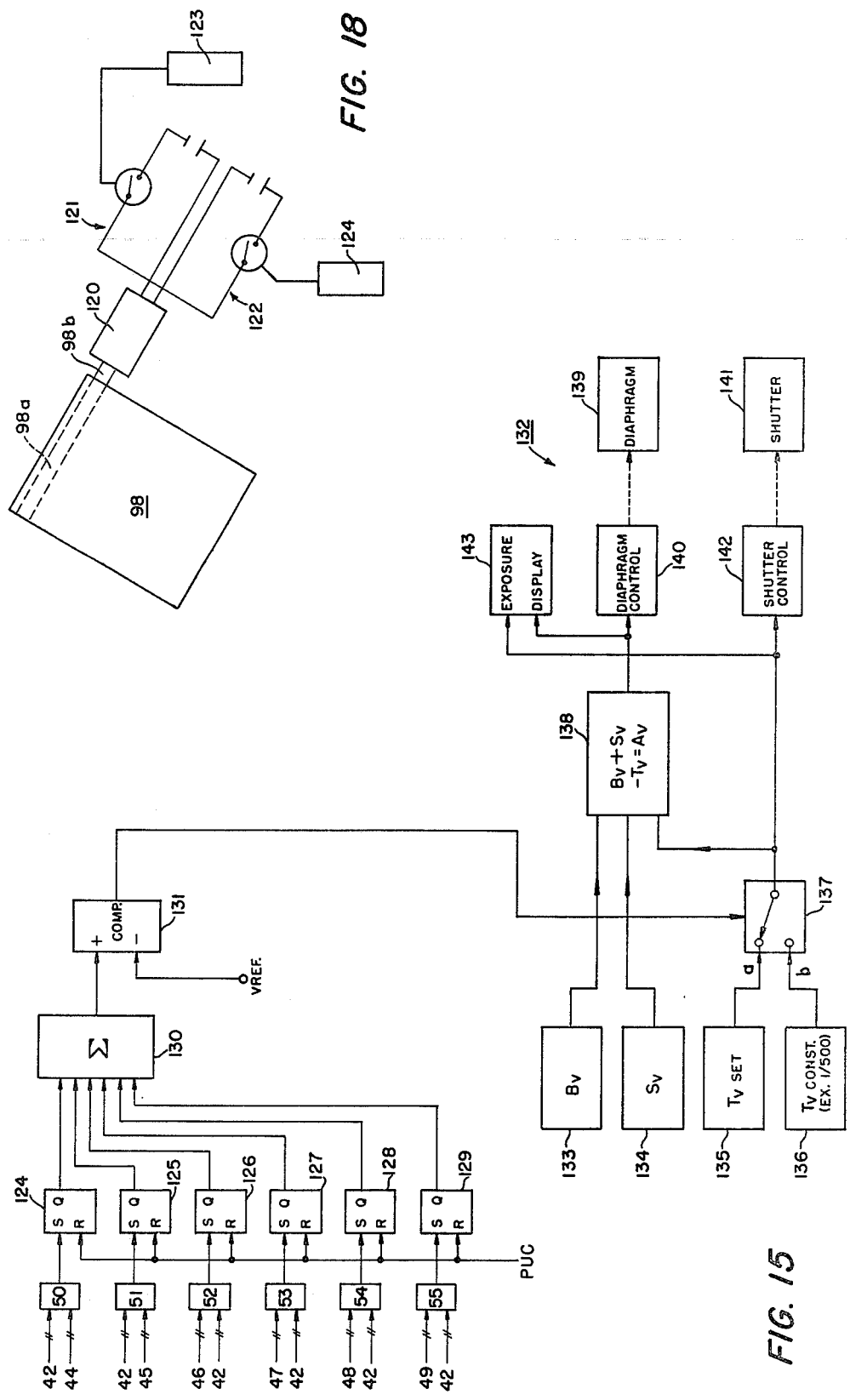
FIG. 15 is a diagram of a second circuit embodiment.
FIG. 18 is a diogrammatic view of a three-position mirror with a stepper motor.

FIG. 15 illustrates a circuit for effecting the exposure control of a camera (e.g. the cameras shown in FIGS. 9–11) by the outputs of the identity operators 50–55.

In FIG. 15, 124–129 are R-S flip-flops provided for cooperation with the identity operators 50–55 so as to memorize which one of the identity operators 50–55 produces the identity signal. The flip-flops 124–129 are provided in such a manner that the outputs of the identity operators 50–55 are supplied to the corresponding set inputs S. Numeral 130 identifies a sum operator for summarizing the Q outputs of the flip-flops 124–129. Numeral 131 is a comparator for comparing the output of the sum operator 130 with the reference voltage V-ref., which is provided in such a manner that the output of the sum operator 130 is supplied to the (+) input while V-ref. is supplied to (−) input. The output voltage of a flip-flop in this circuit is generally the source voltage Vcc; accordingly, if the Vcc is 5 volt, the output of the flip-flop is 5 volt. Therefore, provided that the exposure time must be changed over in case more than three of the six identity operators 50–55 deliver identity signals, by setting the V-ref. as to "5 volt×2<V-ref.<5 volt×3", in case the number of the identity operators which produce the identity signal is less then two, the output of the comparator 131 is low because the output of the sum operator 130 is lower than 5 volt×2, while in case the number of identity operators which produce the identity signal is more than three, the output of the comparator 131 is high because the output of the sum operator 130 is higher than 5 volt×3. Consequently, whether more than three identity operators produce the identity signal or not can be detected by the information as to whether the output of the comparator 131 is high or low. And now, the flip-flops 124–129 are reset by the power up clear signal PUC produced by the first switching action of the touch sensor release 64.

Reference numeral 132 designates an exposure control system of a camera; 133 is a light measuring circuit for measuring the brightness of the object to be photographed so as to produce an object brightness signal Bv; 134 is a film-sensitivity setting circuit for setting the sensitivity Sv of the film to be used; 135 is a shutter-time setting circuit for setting the shutter-time; 136 is a fixed shuttert--time setting circuit for setting a comparatively short time such as 1/500 sec. under which an object in motion can be properly photographed, and 137 is a select circuit for selecting the time-setting circuits 135 and 136 which is controlled by the output of the comparator 131. Numeral 138 is an exposure operation circuit for determining a proper aperture value Av on the basis of the object brightness signal Bv supplied from the light-measuring circuit 133, the film sensitivity signal Sv supplied from the film-sensitivity setting circuit 134 and the shutter-time signal Tv supplied from the time-setting circuit 135 or 136 selected by select circuit 136 by carrying out the calculation of $Bv+Sv-Tv$. Numeral 139 is a diaphragm; 140 is a diaphragm control device for controlling the diaphragm 139 on the basis of the output of the exposure operation circuit 138; 141 is a shutter; 142 is a shutter-control device for controlling the shutter 141 on the basis of the time signal supplied from the time setting circuit 135 or 136 which is selected by the select circuit 137, and 143 is an exposure-value display device to display the shutter time Tv and aperture value Av on the basis of the time signal from the time setting circuit 135 or 136 selected by the select circuit 137 and the output of the exposure operation circuit 138.

The control circuit 123 shown in FIG. 14 is triggered by the first switching action of the touch sensor release 64. In the above mentioned construction, after sensitivity Sv of the film to be used is set by the film sensitivity setting circuit 134 and the desired shutter time Tv is set by the shutter time setting circuit 135, touching of the touch sensor release 64 causes the current to be supplied to all the circuits by the first switching action of the release 64, while the control circuit 123 shown in FIG. A is triggered, so that the detecting operation of the object movement is started, while on the other hand the flip-flops 124–129 are reset by the PUC signal. At this time, because all of the Q outputs of the flip-flops 124–129 are low, the output of the comparator 131 is also low, so that the select circuit 137 in the exposure control system 132 has been changed over to the "a" side so as to select the time setting circuit 135. Thus, the exposure operation circuit 138 determines a proper aperture value Av on the basis of the object brightness signal Bv supplied from the brightness measuring circuit 133, the film sensitivity signal Sv supplied from the film-sensitivity setting circuit 134 and the time signal Tv supplied from the time-setting circuit 135 through the select circuit 137, and the determined aperture value Av is displayed by the display device 143 together with the time value Tv.

Along with the progress of the object movement detection operation, when some of the identity operators 50–55 detect identity addresses and produce identity signals at the time of the fourth scanning, the corresponding flip-flops are set and thereby the Q outputs are changed from "low" to "high", though, at this time, when three of the identity operators 50–55 detect the identity and thereby three of the flip-flops 124–129 are set, the output of the sum operator 130 becomes higher then Vref., so that the output of the comparator 131 is changed from "low" to "high". Thus, the select circuit 137 selects the fixed time-setting circuit 136 instead of the time setting circuit 135. Accordingly, the operation circuit 138 carries out the exposure operation again so as to determine a proper aperture value Av for the fixed time selected by the fixed time-setting circuit 136. The value Av is displayed again together with the fixed time. In consequence, if the release 64 is pushed down in the above mentioned state, the exposure is controlled according to the above mentioned fixed time and the proper aperture value for the time, so that the photographing of the object in motion can be properly carried out at the proper exposure. Now, in case the number of the set flip-flops is below two even at the time of the termination of the object movement detection, namely at the termination of the fourth scanning, the output of the sum operator 130 is smaller than Vref., so that the output of the comparator 131 remains low and, therefore, the change-over of the time-setting circuit by the select circuit 137 is not carried out. After all, the exposure is controlled according to the shutter time set by the time setting circuit 135 and the proper aperture value for the shutter time.

Figure 12:
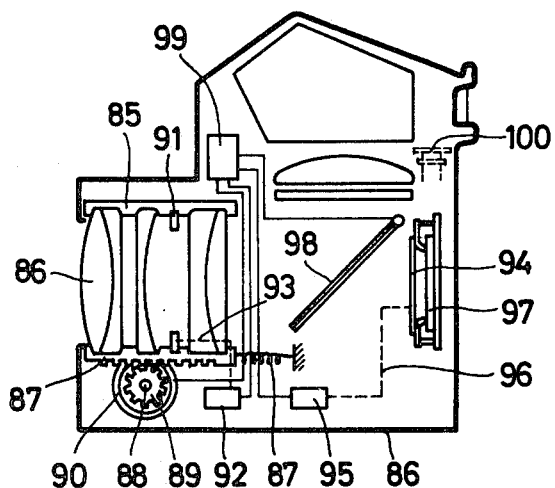
FIG. 12 is a sectional view of a single-lens reflex camera.

FIG. 12 illustrates a single-lens reflex camera comprising an automatic distance adjusting device and an automatic exposure device according to the present invention. This camera includes an optical lens combination 84 which is mounted at a lens mounting 85 and which can be moved along its optical axis. A spring 87 is provided between the lens mounting 85 and the camera housing 86, this spring 87 being able to draw the optical lens combination 84 to the right to assure that in a normal position the focus is so adjusted as if an object at an infinite distance were to be photographed. A rack 87' is mounted on a part of the lens mounting 85 in such a manner that it meshes with a gear wheel 89 which, in turn, is mounted on a drive shaft 88 which is driven by a motor 90.

The aperture of the lens is controlled by a multi-blade diaphragm 91 which, in turn, is controlled by a diaphragm control device 92. The functional relationship is illustrated in the drawing by means of the dotted line 93. A conventional focal plane shutter 94 is controlled by a shutter speed controlling device 95. The functional relationship between these two devices is indicated in the drawing by a dotted line 96. The camera illustrated in FIG. 12 further comprises a film 97, a swinging mirror 98, and a release knob, the latter being constructed in the same way as the release knob of FIG. 10, and being illustrated with dotted lines.

The mode of operation of the camera in FIG. 12 is as follows: when the camera is aligned with the object to be photographed and the sensor plate of the release knob 100 is touched, the swinging mirror 98 is pivoted backwards until it is arranged in parallel to the focal plane shutter 94. Thus, the sensor field of the swinging mirror 98 is in some way the plane of the film 97. The remaining deviation which results from the different distances between the objective and the mirror or the film, respectively, can be eliminated by adding an appropriate bias to the device 99.

The three-position mirror 98 may be mounted for movement as illustrated in FIG. 18 (this description applies analogously also to the swinging mirror in FIGS. 10 and 11).

The mirror 98 is mounted for tilting movement with a shaft 98a which defines a pivot axis for it. This shaft 98a is connected to the output shaft 98b of a stepper motor 120 capable of turning through 360° in 360 steps. Motor 120 is connected to two DC power supplies 121 and 122 each of which has a switch incorporated in it, as shown. A pulse generator 123 (known per se) is connected with the switch of power supply 121; a similar pulse generator 124 is connected with the switch of power supply 122.

When motor 120 is supplied with 45 pulses of a first polarity at its input from one of the power supplies (pulsed by one of the pulse generators), its output shaft 98b will turn through 45°. If the motor then receives 45 pulses of opposite polarity from the other power supply (pulsed by the other pulse generator), then its shaft 98b will turn back to its original position. Evidently, the number of 45 pulses is mentioned only for explanation, since the generators 123, 124 may supply any predetermined number of pulses. Accordingly, the mirror 98 can be made to turn backwards and forwards to any desired position.

The same effect may, of course, also be obtained by using with the motor a bidirectional counter, a single power supply and a bidirectional switch. Another possibility would be to use meshing gears on the shafts 98a and 98b, instead of coupling these shafts fixedly to one another. These gears could then act as step-up gearing or as step-down gearing.

The sensor field may be connected to the device 99 via the line 101 in a similar way as shown in German Offenlegungsschrift No. 24 14 230 (p. 57 ff) or in German Auslegeschrift No. 26 11 576, i.e. the contrast of the reproduction falling upon the sensor field of the mirror 98 is determined by scanning the same. The motor 90 is then activated by an electrical signal derived from the scanning values. Thus, the optical lens system 84 is moved along its optical axis until the maximum sharpness is achieved.

During the adjustment of the lens system 84 a spot brightness measurement or—as an alternative—an integral brightness measurement is carried out which can be determined as a by-product of the brightness of the sensor field. The value of brightness thus measured is transmitted to the device 99 in which information concerning the sensitivity of the film has already been registered.

As soon as the optimum sharpness has been adjusted the imaging object, being sharply reproduced on the sensor field, is checked as to moving objects in the way described above. If the device 99 recognizes that an exposure time of 1/100 seconds is necessary to achieve a reproduction that is sharp despite the moving of the objects, an appropriate aperture setting is calculated by the device 99 which has to be co-ordinated to the exposure time by taking into consideration the brightness at that point in time as well as the sensitivity of the film.

Now the swinging mirror 98 is turned up, and the diaphragm control device 92 and the shutter speed controlling devive 95 are activated, i.e. the focal plane shutter 94 and the multi-blade diaphragm are operated.

An example of an automatic focussing and exposure control system for the camera shown in FIG. 12 will now be explained with reference to FIG. 16.

In FIG. 16, reference numeral 144 is a sample hold circuit for sample-holding the output of the divider 33, 145 is a gate circuit for controlling the delivery of the scanning output of the sensor field 23 obtained through the scanner 31 to the sensor field 23 obtained through the scanner 31 to the subtractor 34, and 146 is a change-over circuit for selectively delivering the output of the subtractor 34 to the object movement detecting system or an auto-focus system 147.

The auto-focus system 147 has an absolute-value calculating circuit 148 for obtaining the absolute value of the output of subtractor 34 delivered through the change-over circuit 146. Numeral 149 is a sum operator for summarizing the output of the absolute value calculation circuit 148; 150 is a peak hold circuit for successively holding the peak value of the output of the sum operator 144; 151 is a sample hold circuit for sample-holding the outputs of the sum operator 144, and 152 is a comparator for comparing the output of the peak hold circuit 150 with the output of the sample hold circuit 151. The comparator 152 is provided in such a manner that the output of the peak hold circuit 150 is supplied to its (+) input and the output of the sample hold circuit 151 is supplied to its (−) input, and it delivers a low signal when the output of the peak hold circuit 150≦the output of the sample hold circuit 151 and a high signal when the output of the peak hold circuit 150≧the output of the sample hold circuit 151.

A lens stop mechanism 153 includes an electromagnet. A lens stop mechanism control circuit 154 controls the lens stop mechanism 153 on the basis of the output of the comparator 152. Numeral 155 is a motor control circuit for controlling the motor 90, and 156 is an in-focus display device for displaying the in-focus state on the basis of the output of the comparator 152.

In the exposure control system 132, numeral 157 is a hold circuit for holding the output of the divider 33, provided in place of the light measuring circuit 133 shown in FIG. 15 and so designed that the output of the hold circuit 157 is supplied to the exposure operation circuit 138 as the object brightness signal Bv. Other components are constructed in the same way as in the exposure control system shown in FIG. 8.

A sequence control circuit 158 controls the whole sequence of the camera, being supplied with the release signal from the touch sensor release 100 and the output of the comparator 152 so as to control the circuits 32, 144, 145, 146, 149, 150, 155, and 159 as well as the pulse generator 38 shown in FIG. 6 and the control circuit 123 shown in FIG. 14.

In the above construction, when a trigger signal is given to the sequence control circuit 158 by the first switching action of the touch sensor release 100, the sequence control circuit 158 sets the change-over circuit 146 at the "a" side for the automatic focussing and at the same time sets the gate circuit 145 at "open(-OFF)", and further actuates the motor control circuit 155 so as to start the advance of the lens 84 by the motor 90, and triggers the pulse generator 38 so as to start the first scanning of the sensor field 23. When this first scanning has been terminated, the sequence control circuit 158 stops the pulse generator 38 and at the same time supplies a hold signal to the sample hold circuit 144 so as to hold the output of the divider 33, namely the mean brightness value; it further clears the sum operator 32, and sets the gate circuit 145 at "close (ON)", and then triggers again the pulse generator 38 so as to start the second scanning. The difference between the scanning output obtained at the second scanning and the mean brightness value is obtained by the subtractor 34 and supplied to the absolute-value calculating circuit 148 through the change-over circuit 146. After the absolute value is obtained, the total sum is obtained by the sum operator 149. After the termination of the second scanning, the sequence control circuit 158 stops the pulse generator 38 and at the same time delivers the hold signal to the peak hold circuit 150 and the sample hold circuit 151 so as to hold the output of the sum operator 149, and further supplies the hold signal to the sample hold circuit 144 so as to hold the output of the divider 33, and then clears the sum operators 149 and 32; thereafter it triggers the pulse generator 38 again so as to start the third scanning.

The same process as described above is repeated many times while the lens (e.g. 84) is being advanced. Supposing that the lens 84 approaches the in-focus position to the object along with the advance thereof, the sharpness of the image on the sensor field 23 is gradually increasing, so that the output of the sum operator 149 is also gradually rising. Accordingly, until the lens 84 reaches the in-focus position, the hold value of the peak hold circuit 150 and that of the sample hold circuit 151 go up gradually as is shown in FIG. 17 at A, wherein the output of the comparator 152 is low as is shown in FIG. D at B. However, when the lens 84 is a little beyond the in-focus position, the sharpness of the image on the sensor field 23 gradually goes down from the maximum sharpness, so that the output of the sum operator 149 is lower than the peak value held in the peak hold circuit 150. Thus, as is clear from FIG. d (A), the output of the sample hold circuit 151 is smaller than the output of the peak hold circuit 150, so that, as is shown in FIG. D (B), the output of the comparator 152 is changed from "low" to "high". Thus, the lens stop mechanism control circuit 154 actuates the lens stop mechanism 153 so as to hold the lens mount 85 to stop the lens 84, and at this time the in-focus display device 156 displays that the lens 84 has been set at the in-focus position.

Thus, the automatic focussing of the lens 84 has been accomplished. On the other hand, the sequence control circuit 158, when supplied with the high output from the comparator 152, stops the operation of the motor control circuit 155 so as to stop the motor 90 and at the same time changes over the change-over circuit 146 from the "a" side to the "b" side in order to carry out the object movement detection and the exposure control, and further triggers the control circuit 123 and the pulse generator 38. Thereby, as mentioned above, the object movement detection is carried out. At the termination of the first scanning for the object movement detection, the sequence control circuit 158 supplies the hold signal to the sample hold circuit 144 so as to hold the output of the divider 33, and at the same time it supplies the hold signal to the hold circuit 157 so as to hold the output of the divider 33 until the termination of the photographing. The output of the divider 33 held in the hold circuit 157 is supplied to the exposure operation circuit 138 as the object brightness signal Bv, so that the operation circuit 138 determines the proper aperture value Av.

At the time of the object movement detection, if the comparator 131 shown in FIG. 15 produces a high signal, the select circuit 137 carries out the time change-over; while no high signal is produced, the time set at the time setting circuit 135 is adopted. Other operations are same as explained with reference to FIG. 15.

Figure 13A:
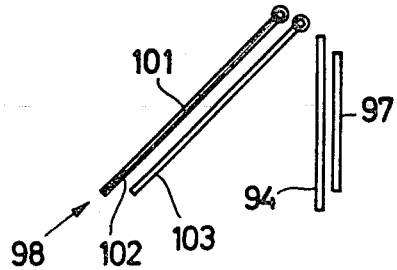
FIG. 13a is a diagrammatic view of a two mirror system for measuring the movement of objects during the exposure procedure.
Figure 13B:
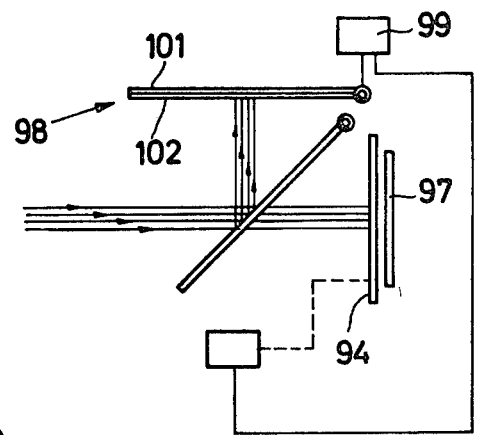
FIG. 13b is a diagrammatic illustration of a mirror system according to FIG. 13a wherein one of the two mirrors has been turned.

FIG. 13 diagrammatically shows how the invention can be adapted to cameras in which brightness is measured when the shutter is open (similar to OM-2 system of OLYMPUS).

The shutter is designated as 94 in FIG. 13a, whereas the film is designated as 97. In front of the shutter 94 a swinging mirror 98 consisting of two layers is illustrated, one layer being a dichroic mirror 101 and the other layer being a sensor field. Contrary to the swinging mirror 80 illustrated in FIG. 11, the photosensitive elements of the mirror 98 shown in FIG. 13a are not directed to the lens, but to the shutter 94.

Adjacent and behind the mirror 98 a second swinging mirror 103 is arranged which reflects the light coming at least partly from the lens.

When the release knob of the camera is operated—after having adjusted the distance—the mirror 98 is turned up and holds the horizontal position shown in FIG. 13a. Now the shutter 94 is also opened and the light can fall upon the film 97. The light is attenuated as compared to the light entering through the lens, since the mirror 103 transmits 90% of the light and reflects 10% of the light to the sensor field 102.

Thus, the sensor field 102 receives information on the brightness of the object to be reproduced and on moving objects, at the very beginning of the opening of the shutter. By scanning the sensor field 102 in the manner already described, it is possible to determine which shutter speed is most appropriate for getting a sharp photograph. Since the beginning of the exposure of the film 97 is known—at the beginning of the opening of the shutter 94 a respective information may be transmitted to the device 99—it is possible to calculate how much time remains for closing the shutter 94. When this time has elapsed the shutter 94 will be closed. During this process it is also possible to control the diaphragm by taking into consideration the over-all brightness and the sensitivity of the film. The aperture of the diaphragm is, of course, different from the aperture under purely static conditions, since the aperture of the diaphragm may be too narrow or too wide at the beginning of the photography. If the aperture was too wide it will be adjusted—during the adjusting process—to a value smaller than the static value. Accordingly, if the aperture was too small at the beginning, the diaphragm is adjusted to a greater value. The shutters and diaphragms used in cameras according to the invention should, of course, be of the rapidly adjustable type.

While the invention has been illustrated and described as embodied in a still camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A system for controlling the exposure in a camera, comprising means for checking the object field to be photographed for the presence of at least one moving object in said field and for producing an electric signal indicative of such presence, said checking means generating at least two successive outputs; means for detecting the amount of relative movement between the camera and object in said field based upon said at least two successive outputs of said checking means, said detecting means including means for storing a first one of said outputs and means for comparing a successive one of said outputs with the stored first output, said detecting means producing an output indicative of said relative movement; and means for setting the camera-shutter speed and operating the camera shutter as a function of said relative movement based upon said output of said detecting means.

2. A system as defined in claim 1; further comprising means for metering the brightness of the object field; means for calculating the diaphragm aperture by taking into consideration the determined shutter speed, the brightness of the object field, and the sensitivity of the film being used; and means for operating said diaphragm according to said calculated aperture interval.

3. A system as defined in claim 1; further comprising means for automatically adjusting the lens of said camera so that at least those parts of the object field intended to be sharply photographed are sharply reproduced on the image plane of the film incorporated in said camera, the adjusting of the lens being performed prior to detection of the relative movement between the camera and the object in said object field.

4. A system for controlling the exposure in a camera, comprising means for initiating the operation of a shutter, means for checking the object field to be photographed as to the presence of at least one object in said field; means for metering the amount of relative movement between the camera and object after the initiation of said operation of the shutter; means for determining the shutter speed as a function of such relative movement in said field after initiating the operation of said shutter; and means for closing said shutter according to the thus determined shutter speed.

5. In a system for controlling the exposure in a camera, said system comprising means for checking and metering the movement of objects within an object field, said means comprising an optical image producing system for producing an image of an object on a two-dimensional field, a sensor field being at least partially arranged on said two-dimensional field and comprising a plurality of sensor elements facing towards the light of said image and change state as a function of brightness changes; a scanning system for scanning the brightness of the light falling on the elements at several successive times; an evaluating device for determining which of the elements, in comparison to the remaining elements, are changing state as a function of the brightness of the light falling on them within a predetermined time, said evaluating device determining the amount of relative movement by evaluating the changing of the brightness; and a switching arrangement operable when a predetermined amount of relative movement is exceeded.

6. A system as defined in claim 5, wherein said optical image producing system is an objective.

7. A system as defined in claim 5, wherein the elements of the sensor field are constituted by a matrix of photo diodes.

8. A system as defined in claim 5, wherein the elements of the sensor field are constituted by the ends of glass fibers.

9. A system as defined in claim 5, wherein said evaluating device comprises storage means, the number of the storage units of said storage means being equal to the number of the sensor elements of said sensor field, and whereby in a first scanning cycle the states detected on said elements are deposited as informations in said storage means, whereas in a second scanning cycle said informations are compared to the newly detected states of said elements.

10. A system as defined in claim 9, wherein said states of the elements are periodically scanned as well as periodically compared to their respective states of the preceding scanning cycle.

11. A system as defined in claim 9, wherein said storage means is a read-and-write memory.

12. A system as defined in claim 9, wherein all elements of said sensor field are successively scanned within one scanning cycle (serial processing).

13. A system as defined in claim 9, wherein all elements of said sensor field are simultaneously scanned within one scanning cycle (parallel processing).

14. A system as defined in claim 9, said checking and metering means further comprising a sum operator assessing an amount of all electrical signals being derived from said elements of said sensor field; a divider, dividing said sum by the number of the elements, thus calculating the mean value of said electrical signals; and a subtractor, calculating the difference between the output signal of each element and the mean value of all electrical signals and giving such difference into said storage means in said evaluating device; and said evaluating device further comprising a comparator, comparing the contents of said storage means for the foregoing scanning cycle to the outputs of said subtractor when the sensor field is being actually scanned.

15. A system as defined in claim 14, the signals originated in said subtractor being supplied to said storage means via an analog-digital-converter and to said comparator.

16. A system as defined in claim 14, said evaluating device further comprising a counter, the respective count of which is coordinated to the respective element just being scanned, said count of said counter being supplied to a calculating device if a signal is received from the comparator indicating that the state of the element has been changed with respect to the foregoing scanning cycle; said calculating device calculating the place numbers of the elements located in front of and above the changed element and depositing said place numbers into stores, the outputs of which are connected to one of the inputs of identity units having two inputs, respectively, and means for generating information signals at the other input of the identity units, said identity units generating control signals when the signals applied to their inputs are both identical.

17. A system as defined in claim 5, said checking and metering means being arranged separately with respect to the view-finder of the camera, comprising an optical image producing system independent of the objective of the camera.

18. A system as defined in claim 17, wherein the objective of the camera includes a focusing device, and said optical image reproducing system includes another focusing device, said devices being coupled to one another.

19. A system as defined in claim 5, further comprising a release knob for initiating detection of the movement of a moving object, and having two switching functions the first of which is triggered by touching a contact sensor and the second of which is triggered by pushing down said knob.

20. A system as defined in claim 5, wherein the image producing system of the objective of the camera serves as an image producing system for said means for detecting the movement of objects within an object field.

21. A system as defined in claim 20; further comprising a mirror of a single lens reflex camera, said mirror including two layers a first one of which comprises a dichroic mirror and a second one of which comprises a sensor field.

22. A system as defined in claim 21, the dichroic mirror having a luminance factor of about 90% and a transmission factor of about 10%.

23. A system for controlling the exposure in a camera, comprising a sensor field having a plurality of light-sensitive elements; means for periodically scanning the states of said elements; means for determining in a first scanning procedure the contrast of the elements and for using the thus determined contrast as a control signal for adjusting the optimum sharpness of an image produced on the plane of the film; and means for determining in a second scanning cycle the changes in the brightness of said elements with a view to the movement of objects in the object field.

24. A system as defined in claim 23, further comprising first mirror means movable from a first to a second position and vice versa and including a dichroic mirror and a sensor field; and second mirror means of the dichroic type and being arranged in a position parallel to said first mirror means when the same is in its first position, said second mirror means remaining in its position when said first mirror means is moved from its first to its second position.

* * * * *